(12) United States Patent
Yoshimura et al.

(10) Patent No.: US 10,575,047 B2
(45) Date of Patent: Feb. 25, 2020

(54) DECODING APPARATUS, DECODING METHOD, ENCODING APPARATUS, AND ENCODING METHOD

(71) Applicant: SONY CORPORATION, Tokyo (JP)

(72) Inventors: Osamu Yoshimura, Kanagawa (JP); Hideki Iwami, Saitama (JP); Sho Amano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 105 days.

(21) Appl. No.: 15/111,241

(22) PCT Filed: Nov. 17, 2014

(86) PCT No.: PCT/JP2014/080362
§ 371 (c)(1),
(2) Date: Jul. 13, 2016

(87) PCT Pub. No.: WO2015/111289
PCT Pub. Date: Jul. 30, 2015

(65) Prior Publication Data
US 2016/0337689 A1 Nov. 17, 2016

(30) Foreign Application Priority Data

Jan. 23, 2014 (JP) ................................ 2014-010280

(51) Int. Cl.
*H04N 21/4363* (2011.01)
*H04N 21/426* (2011.01)
(Continued)

(52) U.S. Cl.
CPC . *H04N 21/43637* (2013.01); *H04N 21/42607* (2013.01); *H04N 21/43635* (2013.01); *H04N 21/44227* (2013.01); *H04W 84/12* (2013.01)

(58) Field of Classification Search
CPC ....... H04N 21/43637; H04N 21/42607; H04N 21/43635; H04N 21/44227; H04W 84/12
See application file for complete search history.

(56) References Cited

U.S. PATENT DOCUMENTS 8,917,642 B2 * 12/2014 Umeuchi .............. H04W 48/20
370/310
2003/0031371 A1 * 2/2003 Kato ........................ G06T 9/00
382/239

(Continued)

FOREIGN PATENT DOCUMENTS

JP 2001-204001 A 7/2001
JP 2003-235041 A 8/2003
(Continued)

OTHER PUBLICATIONS

"Wi-Fi Display Technical Specification Version 1.0.0", Wi-Fi Display Technical Task Group, Aug. 24, 2012, pp. 1-149.
(Continued)

*Primary Examiner* — Sumaiya A Chowdhury
(74) *Attorney, Agent, or Firm* — Chip Law Group

(57) ABSTRACT

There is provided a decoding apparatus that includes a wireless communication unit configured to establish a wireless connection with a plurality of encoding apparatuses, a decoding unit configured to decode pieces of content received from the plurality of encoding apparatuses via the wireless communication unit, a reproduction unit configured to reproduce the plurality of pieces of content decoded by the decoding unit, and a control unit configured to control an encoding condition of each of the plurality of encoding apparatuses for content in a manner that a required decoding capability required by a set of the pieces of content to be reproduced by the reproduction unit does not exceed an actual decoding capability of the decoding unit.

19 Claims, 22 Drawing Sheets

(51) Int. Cl.
*H04N 21/442* (2011.01)
*H04W 84/12* (2009.01)

(56) References Cited

U.S. PATENT DOCUMENTS

| | | | | |
|---|---|---|---|---|
| 2006/0132333 | A1* | 6/2006 | Ozawa | H04L 29/06027 341/50 |
| 2007/0180166 | A1* | 8/2007 | Southerland | H05K 7/1411 710/65 |
| 2008/0141103 | A1* | 6/2008 | Miyazaki | H03M 13/2957 714/801 |
| 2009/0052538 | A1* | 2/2009 | Watanabe | H04N 7/17318 375/240.23 |
| 2009/0052578 | A1* | 2/2009 | Sawai | H04B 7/0413 375/299 |
| 2009/0061887 | A1* | 3/2009 | Hart | H04W 24/10 455/450 |
| 2011/0029606 | A1* | 2/2011 | Ozawa | H04N 7/17318 709/203 |
| 2011/0061086 | A1* | 3/2011 | Huang | H04N 21/234309 725/110 |
| 2011/0268185 | A1* | 11/2011 | Watanabe | H04N 21/2343 375/240.03 |
| 2012/0079329 | A1* | 3/2012 | Steinbach | H04N 19/176 714/704 |
| 2012/0131627 | A1 | 5/2012 | Chittella | |
| 2012/0311068 | A1* | 12/2012 | Gladwin | H04L 65/602 709/214 |
| 2013/0101015 | A1* | 4/2013 | He | H04N 21/234327 375/240.02 |
| 2014/0156719 | A1* | 6/2014 | Leggette | H04L 67/1097 709/201 |
| 2014/0334381 | A1* | 11/2014 | Subramaniam | H04L 65/604 370/328 |
| 2015/0172757 | A1* | 6/2015 | Kafle | H04L 67/1044 725/81 |
| 2015/0205747 | A1* | 7/2015 | Dees | H04M 1/7253 710/303 |
| 2015/0215627 | A1* | 7/2015 | Gu | H04N 7/15 375/240.02 |

FOREIGN PATENT DOCUMENTS

| | | |
|---|---|---|
| JP | 2003-308277 A | 10/2003 |
| JP | 2005-348207 A | 12/2005 |
| JP | 2009-260818 A | 11/2009 |
| WO | 2013/048474 A1 | 4/2013 |
| WO | 2013/056031 A1 | 4/2013 |
| WO | WO-2013123839 A1 * 8/2013 ............... H04N 7/15 |

OTHER PUBLICATIONS

Wi-Fi Alliance, "Wi-Fi Display", Technical Specification Version 1.0.0, Wi-Fi Alliance® Technical Committee Wi-Fi Display Technical Task Group, Aug. 24, 2012, pp. 149.

"Wi-Fi Display Technical Specification", Version 1.0.0, 2012, pp. 149.

Extended European Search Report of EP Patent Application No. 14880364.6, dated Jun. 21, 2017, 9 pages.

Office Action for CN Patent Application No. 201480073193.1, dated Sep. 30, 2018, 4 pages of Office Action and 7 pages of English Translation.

* cited by examiner

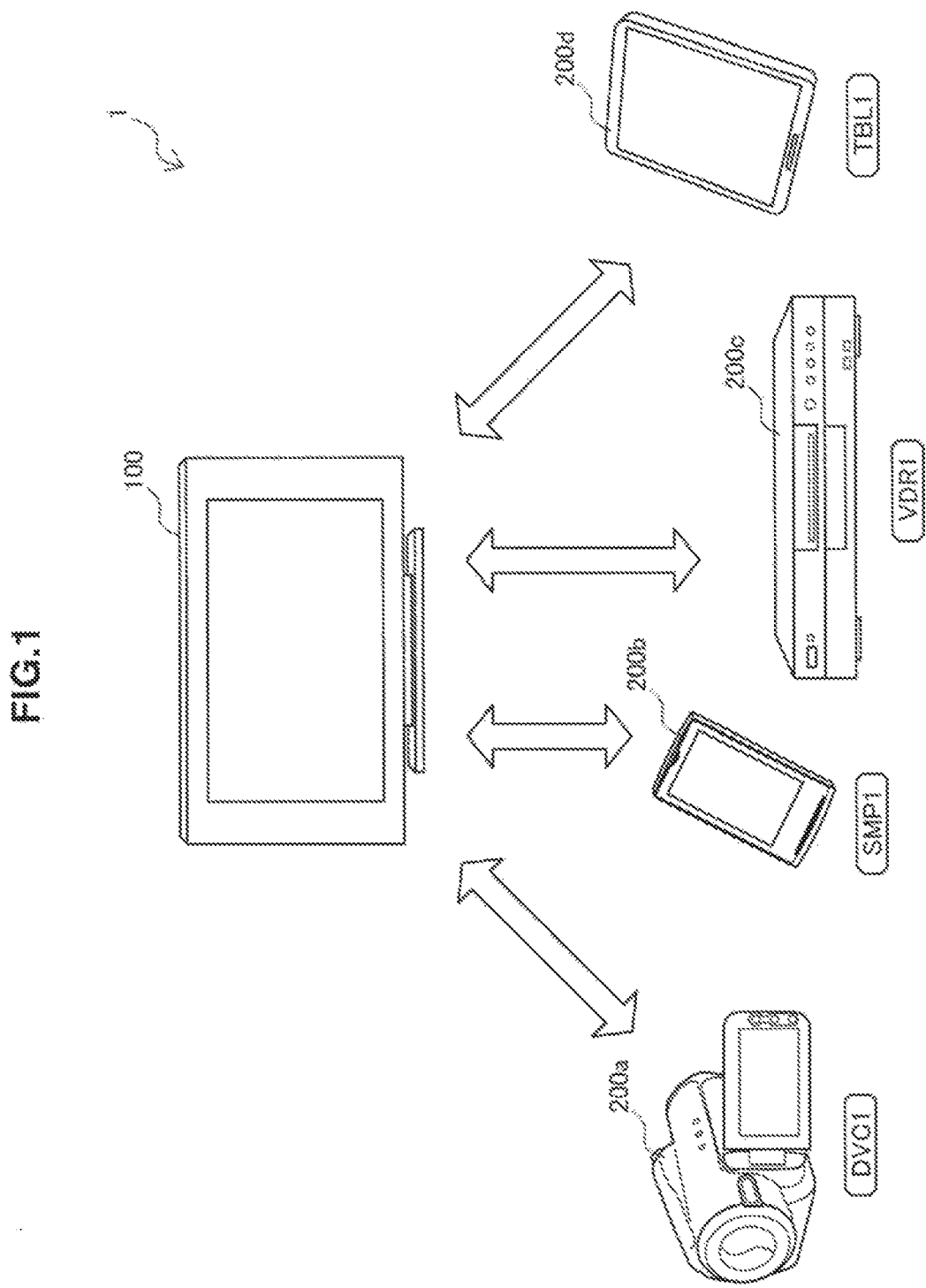

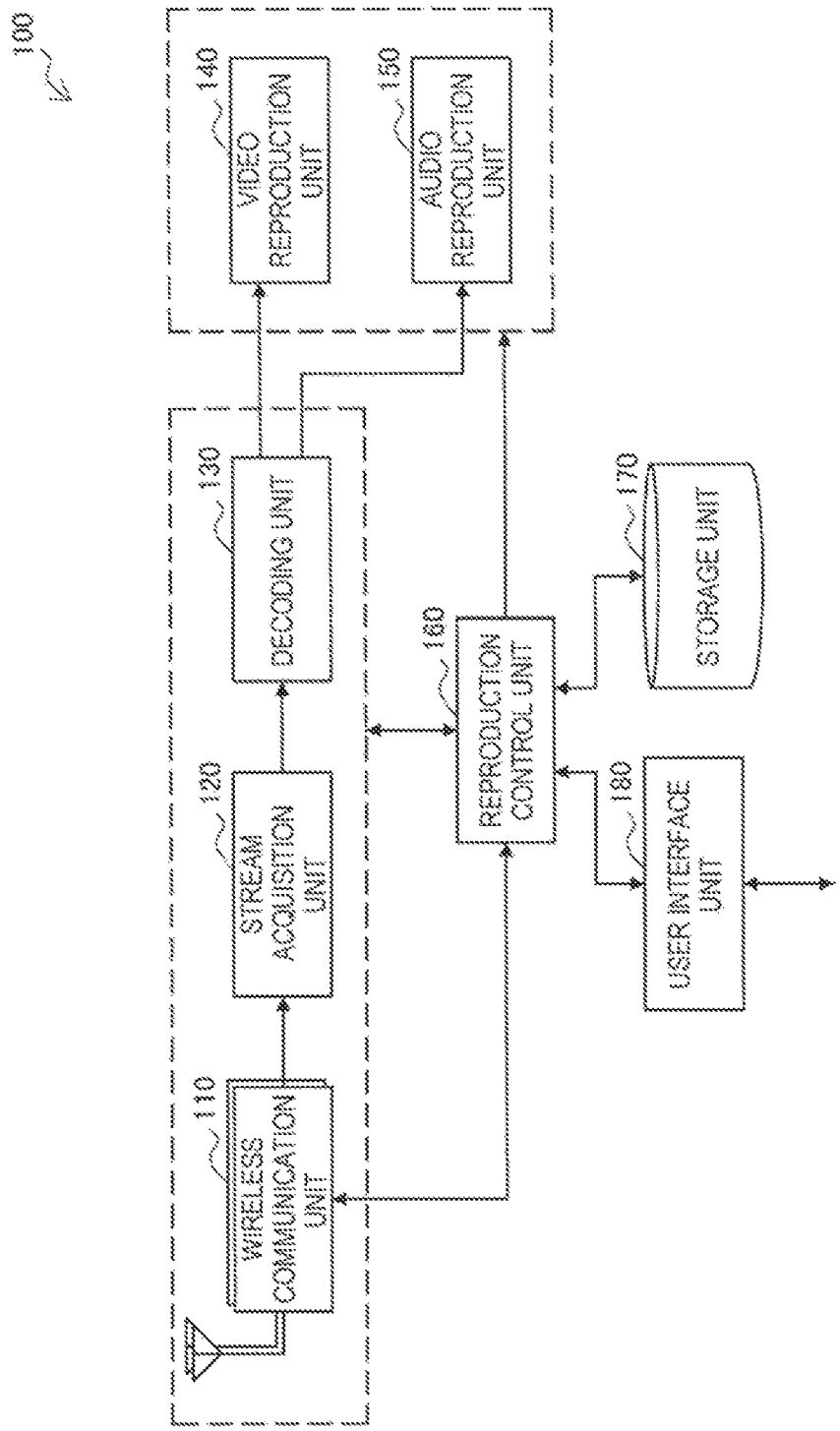

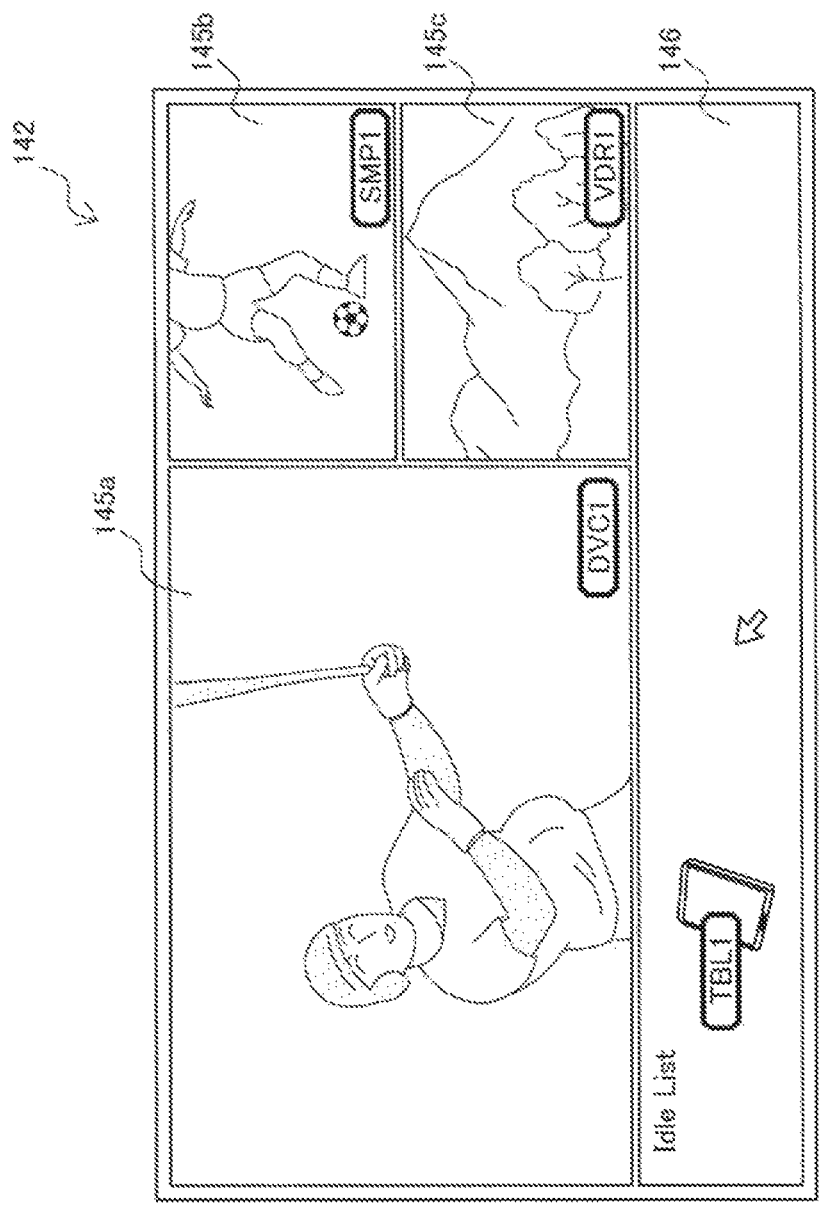

FIG.9
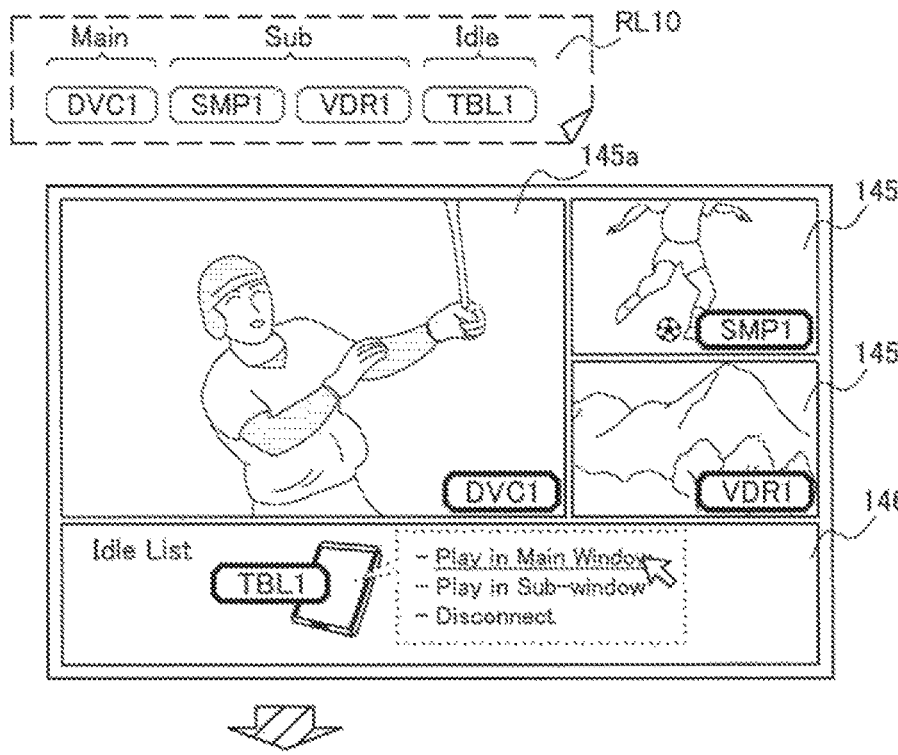
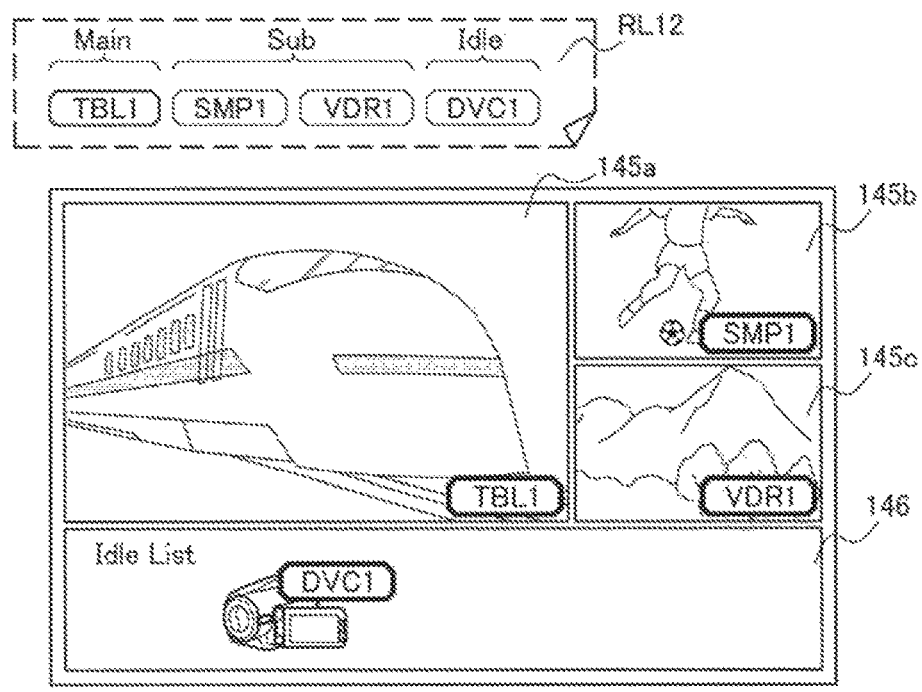

FIG.10
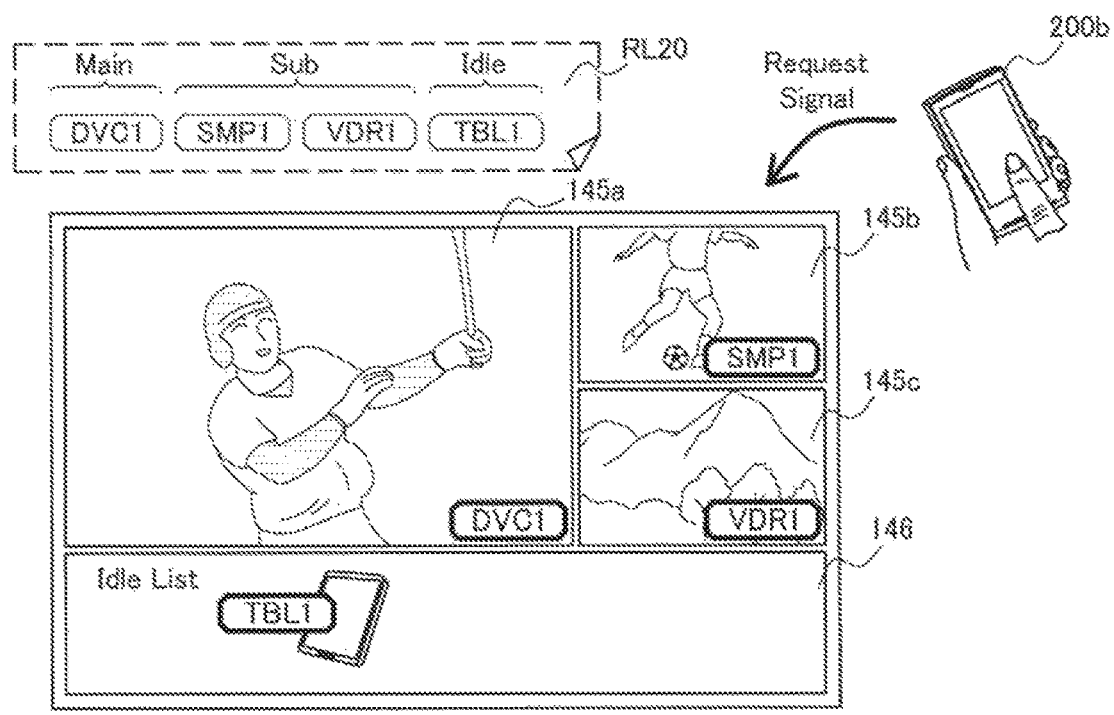
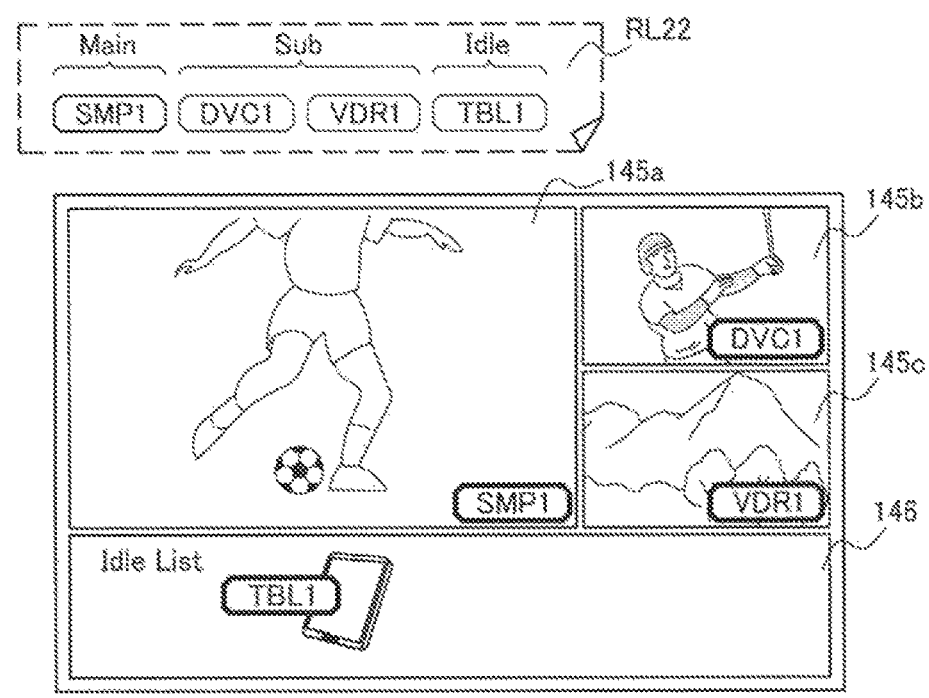

FIG.11
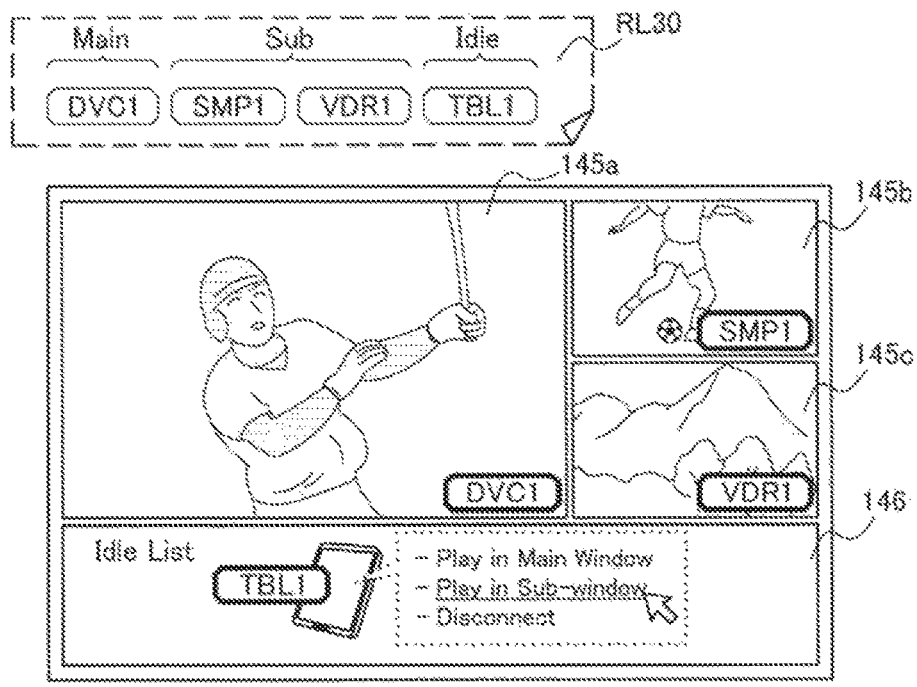
 → EXCEEDS ACTUAL DECODING CAPABILITY (PROCESSOR PERFORMANCE)
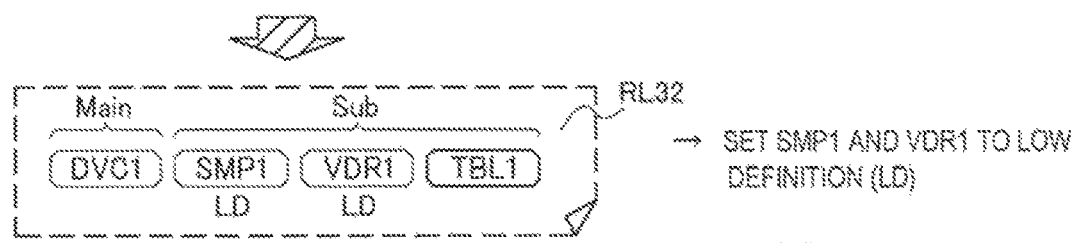 → SET SMP1 AND VDR1 TO LOW DEFINITION (LD)
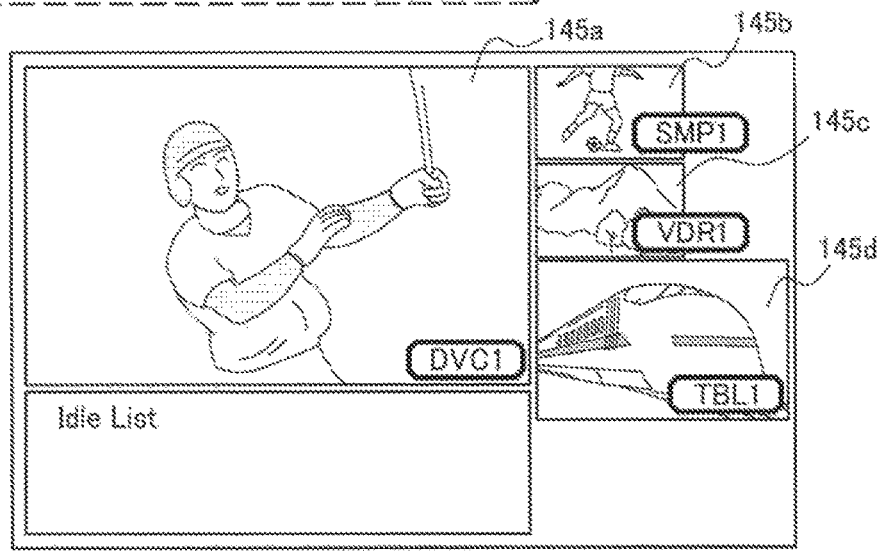

FIG.12
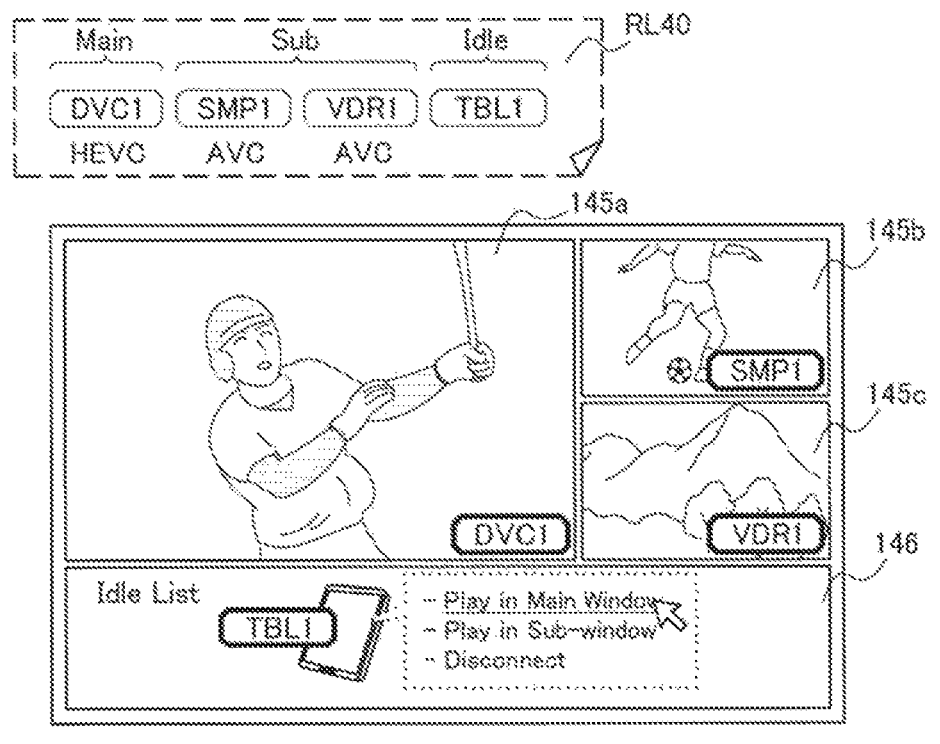
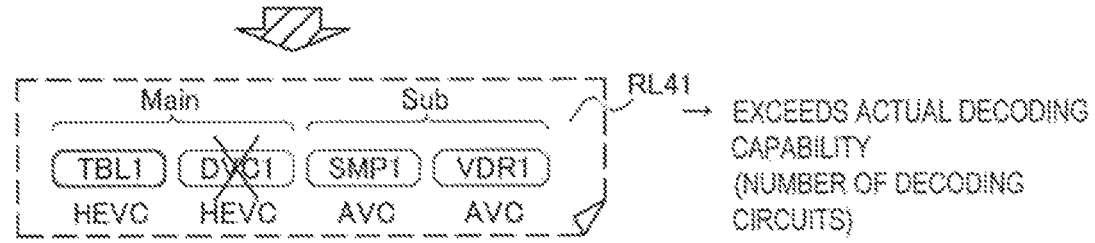
→ EXCEEDS ACTUAL DECODING CAPABILITY (NUMBER OF DECODING CIRCUITS)
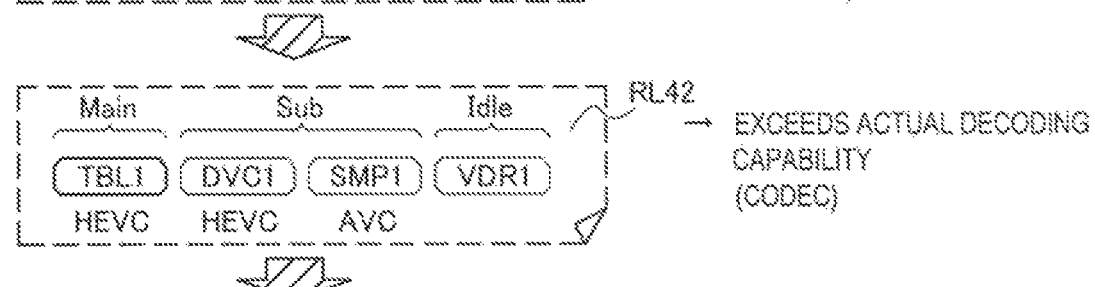
→ EXCEEDS ACTUAL DECODING CAPABILITY (CODEC)
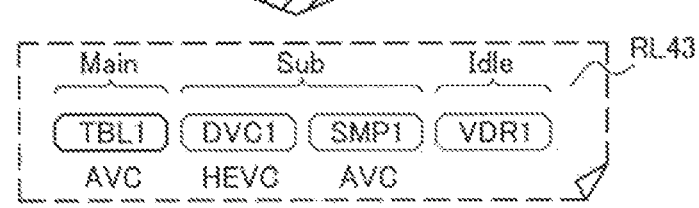

FIG.13
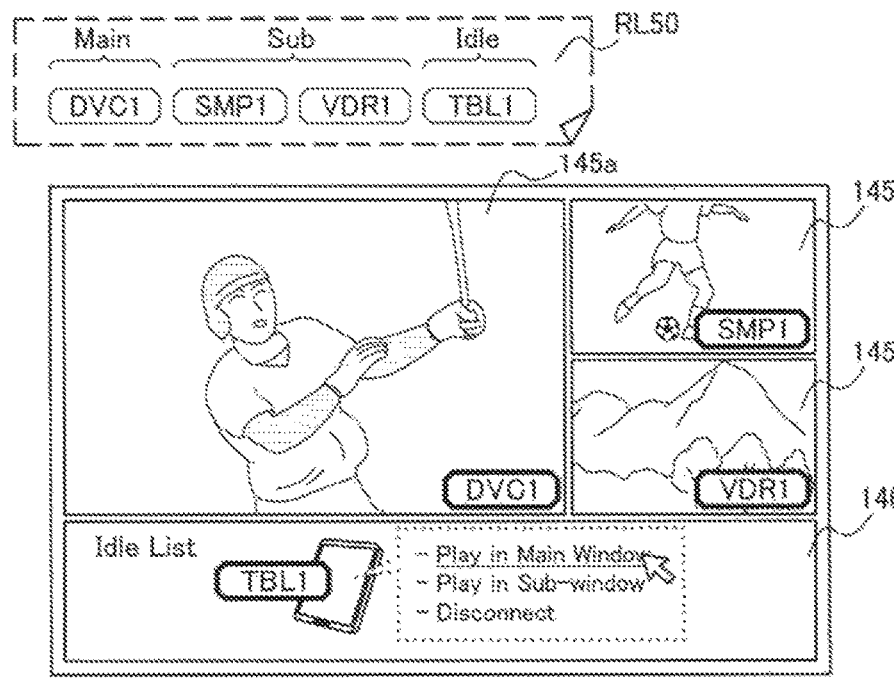
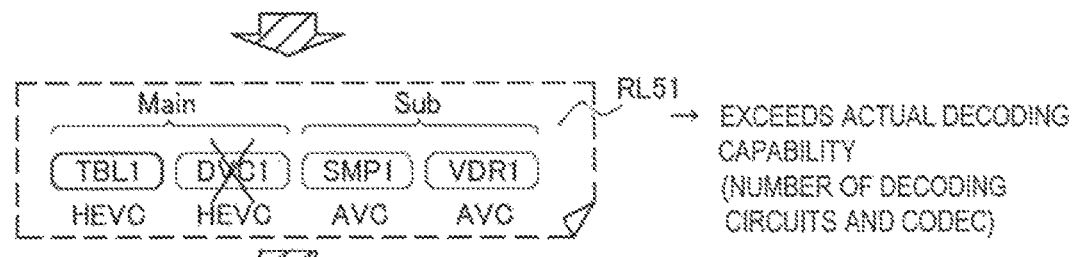
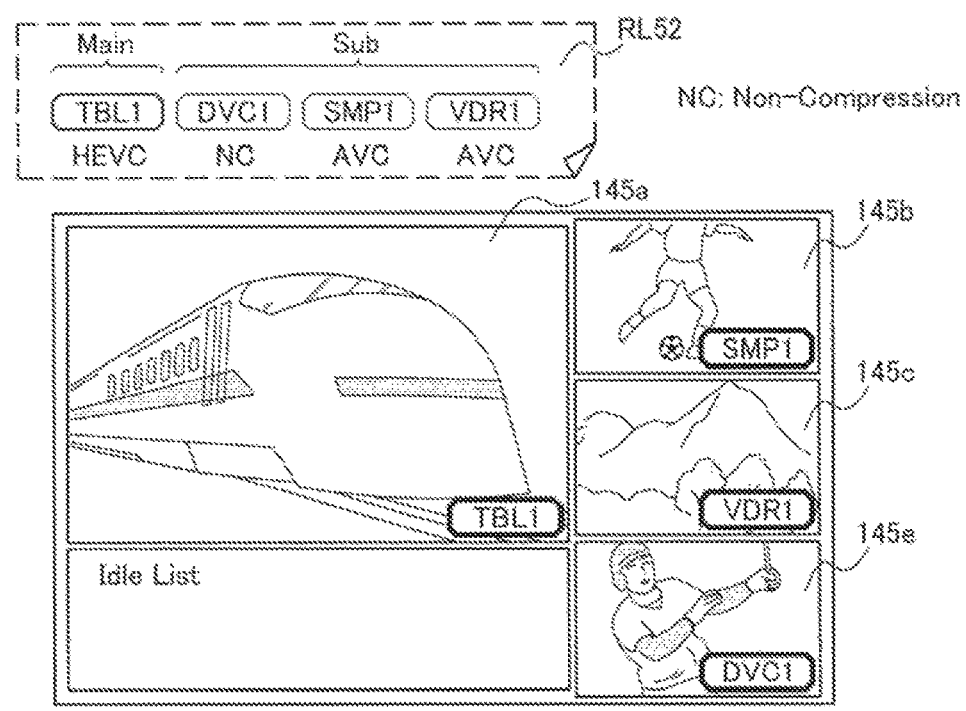

DECODING APPARATUS, DECODING METHOD, ENCODING APPARATUS, AND ENCODING METHOD

CROSS REFERENCE TO RELATED APPLICATIONS

This application is a U.S. National Phase of International Patent Application No. PCT/JP2014/080362 filed on Nov. 17, 2014, which claims priority benefit of Japanese Patent Application No. JP 2014-010280 filed in the Japan Patent Office on Jan. 23, 2014. Each of the above-referenced applications is hereby incorporated herein by reference in its entirety.

TECHNICAL FIELD

The present disclosure relates to a decoding apparatus, a decoding method, an encoding apparatus, and an encoding method.

BACKGROUND ART

Today, various kinds of electronic devices have capabilities of encoding and transferring multimedia content or decoding and reproducing it. Encoded content is transferred on a multimedia network, and is reproduced by a device that receives the content. Multimedia networks were formed mostly using wired communication technologies such as High-Definition Multimedia Interface (HDMI) in the past. However, as a result of the rapid development of wireless communication technologies seen in recent years, wireless communication networks, for example, wireless local area networks (LANs), have been utilized for transfer of multimedia content.

A device that encodes and delivers content as necessary is generally called a source device. On the other hand, a device that receives content from a source device and reproduces it is called a sink device. In order for a sink device to successfully reproduce content, it is important for a source device to deliver content encoded in a form that meets a condition such as a capability or a communication environment of the sink device to a network. Thus, Patent Literature 1 proposes a technique of controlling an encoding condition when a content server that corresponds to a source device encodes content in accordance with a capability of a terminal that corresponds to a sink device.

Non-Patent Literature 1 is the Wi-Fi Display Technical Specification stipulated by the Wi-Fi Alliance. Wi-Fi Display is also called Wi-Fi CERTIFIED Miracast (a registered trademark). Wi-Fi Display employs Wi-Fi Direct for forming a wireless communication network between wireless LAN devices without passing through an access point as an underlying technology, and defines protocols for transferring high-definition video content from a source device to a sink device. Messaging between devices defined in Non-Patent Literature 1 is based on Real Time Streaming Protocol (RTSP). For example, a source device can inquire about a capability of a sink device using an M3 message of the RTSP and set an operation of the sink device using an M4 message of the RTSP.

CITATION LIST

Patent Literature

Patent Literature 1: JP 2009-260818A

Non-Patent Literature

Non-Patent Literature: "Wi-Fi Display Technical Specification Version 1.0.0," Wi-Fi Alliance Technical Committee, Wi-Fi Display Technical Task Group, Aug. 24, 2012

SUMMARY OF INVENTION

Technical Problem

However, when one sink device attempts to reproduce a plurality of pieces of content each received from a different source device, an existing technology in which the source devices serve as masters and control content encoding and decoding conditions causes inconvenience. For example, it is assumed that a certain source device encodes content using an encoding method supported by the sink device and transmits the content to the sink device. At the same time, another source device can also encode other content using the same encoding method and transmit the content to the sink device. However, if the sink device has only one circuit with which content can be decoded using the encoding method, it is not possible for the sink device to simultaneously reproduce the content received from the two source devices. This kind of problem also occurs when a decoding process is implemented by software rather than by hardware.

Therefore, it is desirable to provide a mechanism that enables a sink device to appropriately control a content encoding or decoding condition on the premise that there are a plurality of source devices.

Solution to Problem

According to the present disclosure, there is provided a decoding apparatus including: a wireless communication unit configured to establish a wireless connection with a plurality of encoding apparatuses; a decoding unit configured to decode pieces of content received from the plurality of encoding apparatuses via the wireless communication unit; a reproduction unit configured to reproduce the plurality of pieces of content decoded by the decoding unit; and a control unit configured to control an encoding condition of each of the plurality of encoding apparatuses for content in a manner that a required decoding capability required by a set of the pieces of content to be reproduced by the reproduction unit does not exceed an actual decoding capability of the decoding unit.

In addition, according to the present disclosure, there is provided a decoding method including: decoding, by a decoding apparatus, pieces of content received from a plurality of encoding apparatuses via a wireless connection; reproducing the plurality of pieces of decoded content; and controlling, by the decoding apparatus, an encoding condition of each of the plurality of encoding apparatuses for content in a manner that a required decoding capability required by a set of the pieces of content to be reproduced does not exceed an actual decoding capability of the decoding apparatus.

In addition, according to the present disclosure, there is provided an encoding apparatus including: a wireless communication unit configured to establish a wireless connection with a decoding apparatus that decodes and reproduces pieces of content received from a plurality of apparatuses; an encoding unit configured to encode content to be transmitted to the decoding apparatus via the wireless communication unit; and a control unit configured to control an encoding condition of the encoding unit for content based on a control message received from the decoding apparatus in a manner that a required decoding capability required by a set of the pieces of content to be reproduced by the decoding apparatus does not exceed an actual decoding capability of the decoding apparatus.

In addition, according to the present disclosure, there is provided an encoding method including: encoding, by an encoding apparatus that transmits content via a wireless connection to a decoding apparatus that decodes and reproduces pieces of the content received from a plurality of apparatuses, the content to be transmitted to the decoding apparatus; and controlling an encoding condition of the encoding apparatus for content based on a control message received from the decoding apparatus in a manner that a required decoding capability required by a set of the pieces of content to be reproduced by the decoding apparatus does not exceed an actual decoding capability of the decoding apparatus.

Advantageous Effects of Invention

According to the technology of the present disclosure, it is possible to appropriately reproduce content received from a plurality of source devices in a sink device, without exceeding a decoding capability of the sink device.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an illustrative diagram for describing an overview of a content reproduction system according to an embodiment.

FIG. 2 is a block diagram showing an example of a configuration of a sink device according to an embodiment.

FIG. 4A is an illustrative diagram showing a first example of a configuration of a display image output by a video reproduction unit of a sink device.

FIG. 9 is an illustrative diagram for describing an exemplary first control scenario relating to control of an encoding condition.

FIG. 10 is an illustrative diagram for describing an exemplary second control scenario relating to control of an encoding condition.

FIG. 11 is an illustrative diagram for describing an exemplary third control scenario relating to control of an encoding condition.

FIG. 12 is an illustrative diagram for describing an exemplary fourth control scenario relating to control of an encoding condition.

FIG. 13 is an illustrative diagram for describing an exemplary fifth control scenario relating to control of an encoding condition.

DESCRIPTION OF EMBODIMENT(S)

Figure 3A:
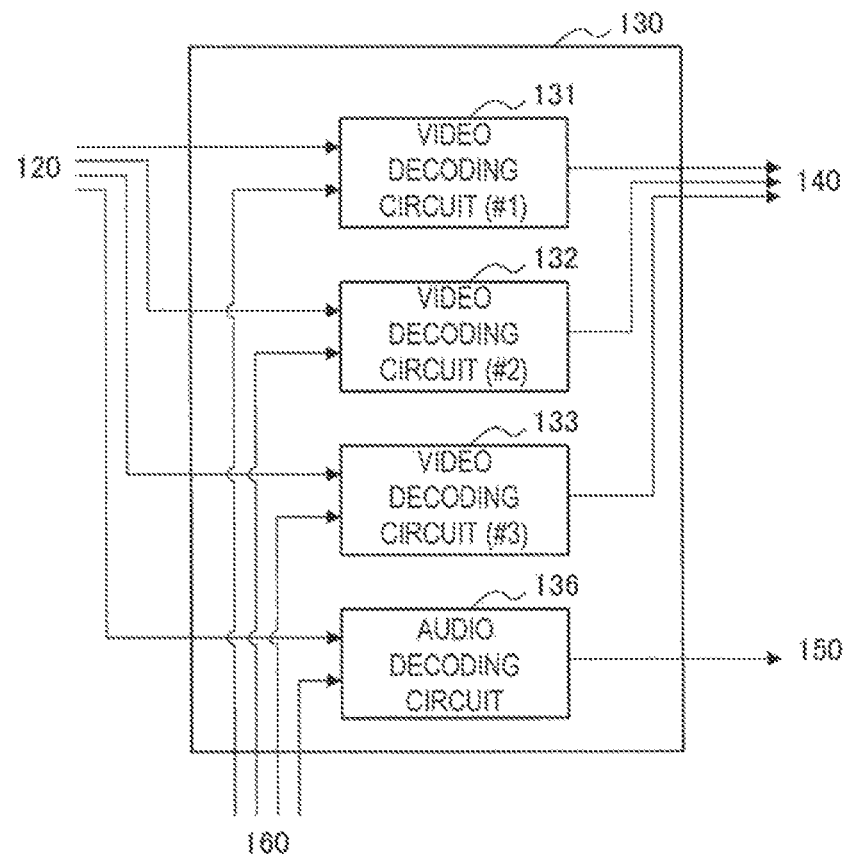
FIG. 3A is a block diagram showing a first example of a detailed configuration of a decoding unit of a sink device.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In addition, description will be provided in the following order.

1. System overview
2. Configuration example of a sink device
3. Configuration example of a source device
4. Process flow
4-1. Process on a sink side
4-2. Process on a source side
5. Control scenarios
6. Messaging sequences (examples of Wi-Fi Display)
6-1. Schematic flow
6-2. Existing capability negotiation procedure
6-3. Extended messaging sequence (a first technique)
6-4. Extended messaging sequence (a second technique)
7. Application examples
8. Conclusion

1. SYSTEM OVERVIEW

FIG. 1 is an illustrative diagram for describing an overview of a content reproduction system 1 according to an embodiment. The content reproduction system 1 includes a sink device 100, a source device 200a, a source device 200b, a source device 200c, and a source device 200d. The sink device 100 establishes a wireless connection with each of the source device 200a, the source device 200b, the source device 200c, and the source device 200d.

A sink device is an apparatus that decodes content received from a source device and reproduces the decoded content. In the example of FIG. 1, the sink device 100 is a digital television apparatus. A source device is an apparatus that encodes content when necessary and transmits the encoded content to a sink device. In the content reproduction system 1, content transmitted from a source device to the sink device typically includes at least one of video content and audio content. In the example of FIG. 1, the source device 200a is a digital video camera with an identifier of "DVC1." The source device 200b is a smartphone with an identifier of "SMP1." The source device 200c is a content recorder with an identifier of "VDR1." The source device 200d is a tablet personal computer (PC) with an identifier of "TBL1." Note that the technology according to the present disclosure is not limited to the illustrated example, and can be applied to any type of a sink device and a source device, for example, a desktop PC, a laptop PC, a personal digital assistant (PDA), a mobile telephone, a game device, a wearable device, and a storage device. In the description of the present specification provided below, if there is no need to distinguish the source device 200a, the source device 200b, the source device 200c, and the source device 200d, the devices will be collectively referred to as source devices 200.

A wireless connection between the sink device 100 and the source devices 200 may be formed in any type of wireless communication scheme, for example, a wireless local area network (LAN) scheme such as IEEE 802.11a, 11b, 11g, 11n, 11 ac, or 11ad, a wireless personal area network (PAN) scheme such as ultra wideband (UWB) or Zigbee, or a wireless metropolitan area network (MAN) scheme such as IEEE 802.16. In addition, an intermediate device such as a wireless access point may or may not be interposed between the sink device 100 and the source devices 200. Note that, in description below, it is assumed that the sink device 100 and the source devices 200 are connected in a wireless LAN scheme and content is transferred therebetween according to a messaging specification of Wi-Fi Display on the wireless LAN connection, as an example. In this case, the wireless LAN connection can be established between the sink device 100 and the source devices 200 using Wi-Fi Direct or using a connection protocol that is called Tunneled Direct Link Setup (TDLS). Furthermore, a control channel for exchanging user input information may be formed between the sink device 100 and the source devices 200. The control channel may be, for example, a Transmission Control Protocol/Internet Protocol (TCP/IP)-based User Input Back Channel (UIBC). Note that content may be transferred using another remote desktop application, for example, virtual network computing (VNC), instead of Wi-Fi Display.

The source devices 200 may provide, for example, video content acquired by photographing a subject using a camera or audio content acquired by collecting sounds of the real world using a microphone to the sink device. In addition, the source devices 200 may provide content received from a remote device via a network to the sink device. In addition, the source devices 200 may provide content read from a storage device (for example, a hard disk drive) to the sink device. On the other hand, in the present embodiment, the sink device 100 receives content pieces from the plurality of source devices 200 in parallel and decodes and reproduces each of the received pieces of content as necessary.

In existing techniques, content encoding and decoding conditions are mostly controlled by source devices in general. However, when the sink device 100 attempts to reproduce a plurality of pieces of content each received from the different source devices 200, such control performed on the source side causes inconvenience. For example, it is assumed that the source device 200a encodes content in an encoding scheme that the sink device 100 supports and transmits the encoded content to the sink device 100. At the same time, the source devices 200b, 200c, or 200d can encode different content as well using the same encoding scheme and transmit the encoded content to the sink device 100. However, if the sink device 100 has only one circuit in which the content can be decoded in the encoding scheme (or if the sink device 100 does not have processor performance that can decode two pieces of content in the encoding scheme in parallel), the sink device is not able to simultaneously reproduce the content received from the source devices. In order to resolve or alleviate such inconvenience, it is desirable to realize a mechanism that enables a sink device to control a content encoding or decoding condition on the premise that there are a plurality of source devices. Embodiments relating to such a mechanism will be described in detail in the subsequent sections.

2. CONFIGURATION EXAMPLE OF A SINK DEVICE

FIG. 2 is a block diagram showing an example of a configuration of the sink device 100 according to an embodiment. Referring to FIG. 2, the sink device 100 is provided with a wireless communication unit 110, a stream acquisition unit 120, a decoding unit 130, a video reproduction unit 140, an audio reproduction unit 150, a reproduction control unit 160, a storage unit 170, and a user interface unit 180.

(1) Wireless Communication Unit

The wireless communication unit 110 is a wireless interface that mediates wireless communication of the sink device 100 with another apparatus. In the present embodiment, the wireless communication unit 110 establishes wireless connections with the plurality of source devices (encoding apparatuses that encode content) 200. In addition, the wireless communication unit 110 receives radio signals including content data transmitted from the source devices 200 on wireless connections via an antenna. The wireless communication unit 110 outputs the received signals including the content data to the stream acquisition unit 120. In addition, the wireless communication unit 110 can also perform transmission and reception of wireless signals including control messages with the source devices 200. Control messages transmitted to the source devices 200 are generated by the reproduction control unit 160 that will be described below. In addition, control messages received from the source devices 200 are interpreted by the reproduction control unit 160.

The wireless communication unit 110 can use a plurality of frequency channels that have different transfer rates in a parallel or selective manner. A plurality of frequency channels may be, for example, channels each having transfer rates of 2.4 GHz, 5 GHz, and 60 GHz. The wireless communication unit 110 can switch frequency channels to be used for reception of content from each source device 200 according to allocation made by the reproduction control unit 160 which will be described below. Typically, high bit rate content (for example, content displayed on a multi-frame main window) can be transferred on a channel with a high transfer rate, and low bit rate content (for example, content displayed on a multi-frame sub window) can be transferred on a channel with a low transfer rate. The wireless communication unit 110 may measure connection quality of each frequency channel and output a quality index indicating a measurement result (for example, a received signal intensity, a signal-to-noise ratio (SNR), or the like) to the reproduction control unit 160.

(2) Stream Acquisition Unit

The stream acquisition unit 120 acquires bit streams of content to be reproduced (for example, video content or audio content) from received signals input from the wireless communication unit 110. Then, the stream acquisition unit 120 outputs the bit streams acquired with respect to the content to be reproduced to the decoding unit 130.

The stream acquisition unit 120 may measure a quality index for evaluating connection quality of a wireless connection for each stream (for example, a bit error rate (BER), a packet error rate (PER), or the like) and output the quality index to the reproduction control unit 160.

(3) Decoding Unit

The decoding unit 130 decodes content from bit streams of content received from the one or more source devices 200. After decoding video content, the decoding unit 130 outputs the decoded video content to the video reproduction unit 140. In addition, after decoding audio content, the decoding unit 130 outputs the decoded audio content to the audio reproduction unit 150. The decoding unit 130 can decode a plurality of pieces of content in parallel. When content is compressed and encoded, the content is decompressed through a decoding process of the decoding unit 130.

FIG. 3A is a block diagram showing a first example of a detailed configuration of the decoding unit 130 of the sink device 100. In the first example, the decoding unit 130 has a first video decoding circuit 131, a second video decoding circuit 132, a third video decoding circuit 133, and an audio decoding circuit 136. The first video decoding circuit 131 is a decoding circuit that supports, for example, H.265/HEVC as a video codec. The second video decoding circuit 132 and the third video decoding circuit 133 are decoding circuits that support, for example, H.264/AVC as a video codec. The audio decoding circuit 136 is a decoding circuit that supports an audio codec such as AAC, MP3, LPCM, or the like. In the first example, an actual decoding capability of the decoding unit 130 is equivalent to all of the capabilities of the decoding circuits. The actual decoding capability can be expressed by at least one of the number of decoding circuits, a codec type supported by each decoding circuit, definition, a rate (a frame rate, a sampling rate, or the like), and a quality level (bit depth, a quantization step, or the like).

Figure 3B:
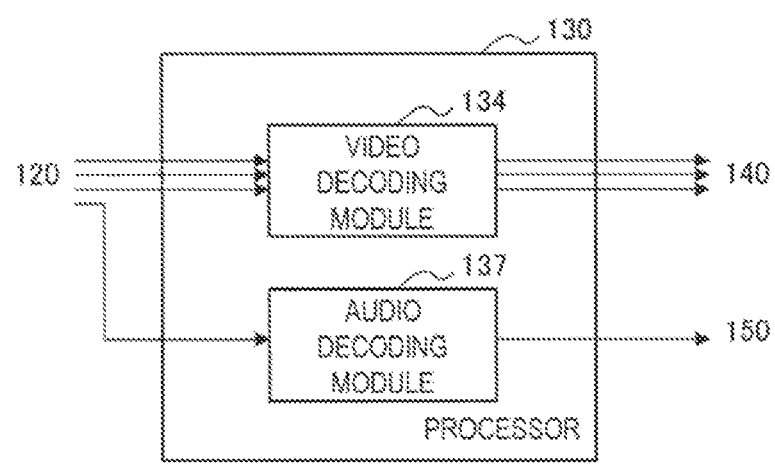
FIG. 3B is a block diagram showing a second example of a detailed configuration of the decoding unit of the sink device.

FIG. 3B is a block diagram showing a second example of a detailed configuration of the decoding unit 130 of the sink device 100. In the second example, the decoding unit 130 is configured as a processor, and the processor executes a software module read from a memory (not illustrated). The software module executed by the decoding unit 130 includes, for example, a video decoding module 134 and an audio decoding module 137. The video decoding module 134 can support H.265/HEVC and H.264/AVC as video codecs. The audio decoding module 137 can support AAC, MP3, or LPCM as an audio codec. In the second example, an actual decoding capability of the decoding unit 130 depends on the processor performance. Processor performance required for decoding content can depend on decoding conditions such as a codec type, definition, a rate, and a quality level of content to be decoded.

Note that a configuration of the decoding unit 130 is not limited to the above-described examples. The decoding unit 130 may have more or fewer decoding circuits. In addition, the decoding unit 130 may have both decoding circuits as hardware and a processor that executes software modules for video decoding and audio decoding. In addition, the decoding unit 130 may support a different codec type from those exemplified above.

(4) Video Reproduction Unit

The video reproduction unit 140 and the audio reproduction unit 150 are used for reproducing a plurality of pieces of content decoded by the decoding unit 130. The video reproduction unit 140 sequentially outputs each frame of video content decoded by the decoding unit 130 to a display. When a plurality of pieces of video content are decoded in parallel, the video reproduction unit 140 can, for example, merge frames of the video content into one image (or blend them together) and output a multi-frame display image to a display.

FIG. 4A is an illustrative diagram showing a first example of a configuration of a display image output by the video reproduction unit 140 of the sink device 100 to a display. Referring to FIG. 4A, a display image 142 includes a main window 145a, a sub window 145b, another sub window 145c, and an idle device window 146. The main window 145a is a window for displaying main content that can be selected based on a user input. The sub window 145b and the sub window 145c are windows for displaying each piece of sub content that can be decoded in parallel with main content. Main content and sub content constitute a content reproduction set. The idle device window 146 is a window for displaying a list of the source devices 200 that do not provide content that is being reproduced to the sink device 100, but maintain the wireless connection with the sink device 100 at that time (hereinafter referred to as an idle list). In the example of FIG. 4A, content received from the source device 200a is displayed on the main window 145a, content received from the source device 200b is displayed on the sub window 145b, and content received from the source device 200c is displayed on the sub window 145c. On the other hand, content from the source device 200d is not reproduced, and an icon of the source device 200d (and an identifier that identifies the device) is displayed on the idle device window 146.

Figure 4B:
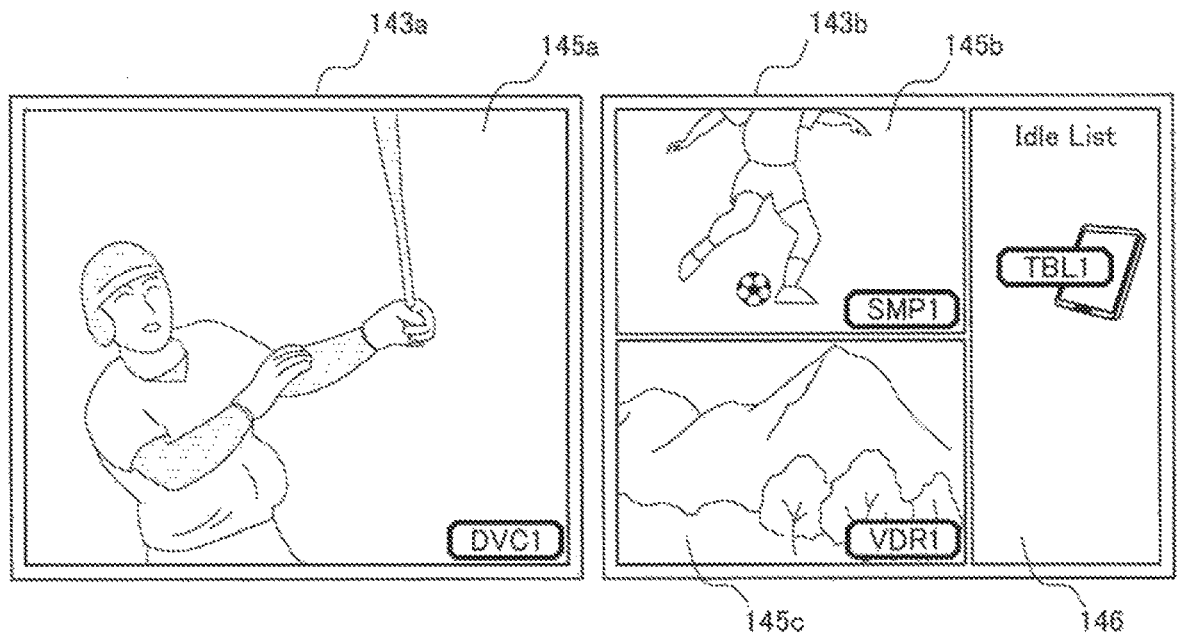
FIG. 4B is an illustrative diagram showing a second example of a configuration of a display image output by a video reproduction unit of a sink device.

FIG. 4B is an illustrative diagram showing a second example of a configuration of display images output by the video reproduction unit 140 of the sink device 100 to displays. Referring to FIG. 4B, a display image 143a output to a first display and a display image 143b output to a second display are shown. The display image 143a includes the main window 145a. The display image 143b includes the sub window 145b, the sub window 145c, and the idle device window 146. As described, the video reproduction unit 140 may be able to output individual display images to a plurality of displays. In addition, each of the display images may include any number of and any type of windows.

Figure 4C:
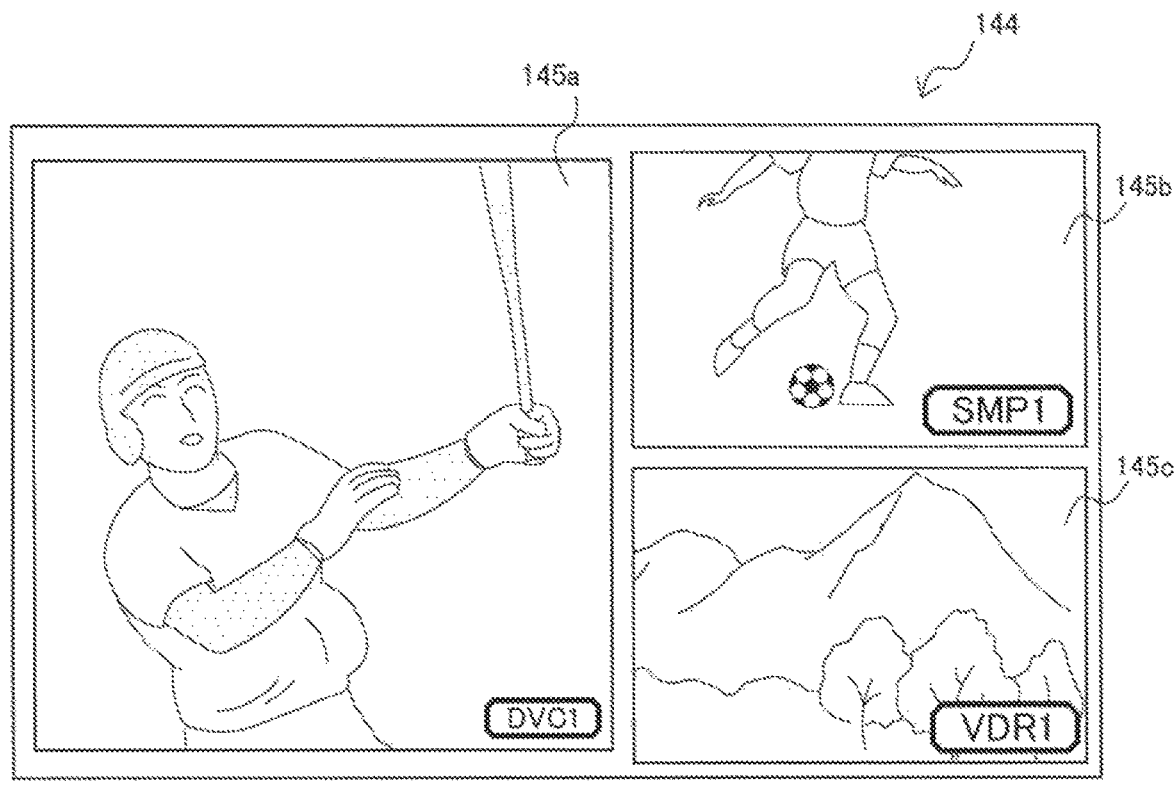
FIG. 4C is an illustrative diagram showing a third example of a configuration of a display image output by a video reproduction unit of a sink device.

FIG. 4C is an illustrative diagram showing a third example of a configuration of a display image output by the video reproduction unit 140 of the sink device 100 to a display. Referring to FIG. 4C, while a display image 144 includes the main window 145a, the sub window 145b, and the sub window 145c, the image does not include the idle device window 146 shown in FIGS. 4A and 4B. In this manner, it is not necessary to display an idle device window (or an idle list).

Note that a display may be configured to be integrated with the sink device 100 or may be connected to the sink device 100 in an interchangeable manner. The video reproduction unit 140 can adjust a display attribute (for example, a frame size or the like) of video content to be reproduced in accordance with a desired window configuration and a specification of a display serving as an output destination. As a display, a monitor or a projector may be used.

(5) Audio Reproduction Unit

The audio reproduction unit 150 sequentially outputs audio signals of audio content decoded by the decoding unit 130 to a speaker. Content reproduced by the audio reproduction unit 150 may be audio content accompanying video content that is main content or sub content, or may be discrete audio content that does not relate to video content.

(6) Reproduction Control Unit

The reproduction control unit 160 controls encoding conditions of the plurality of source devices 200 that are transmission sources of content not to cause a required decoding capability required for a set of the content reproduced by the video reproduction unit 140 and the audio reproduction unit 150 (content reproduction set) to exceed an actual decoding capability of the decoding unit 130. The content reproduction set can typically be generated and updated based on user inputs acquired via the user interface unit 180. The reproduction control unit 160 decides a required decoding capability with respect to a first generated or recently updated content reproduction set, and compares the decided required decoding capability to the actual decoding capability of the decoding unit 130. When the required decoding capability does not exceed the actual decoding capability, the reproduction control unit 160 can maintain the content reproduction set and an encoding condition thereof without change. When the required decoding capability exceeds the actual decoding capability, the reproduction control unit 160 changes an encoding condition of at least one source device 200 in order to lessen the required decoding capability.

In order to make it possible to appropriately decide an encoding condition of the source devices 200, the reproduction control unit 160 discerns encoding capabilities of each of the source devices 200 in advance. More specifically, the reproduction control unit 160 collects encoding capability information from each of the source devices 200 by transmitting capability inquiry messages to each of the source devices 200 via the wireless communication unit 110, and causes the storage unit 170 to store the collected encoding capability information. Then, the reproduction control unit 160 decides an encoding condition of the source devices 200 within the range that is permissible according to the collected encoding capability information of each of the source devices 200.

For example, while the Wi-Fi Display Technical Specification defined in Non-Patent Literature 1 defines a message for inquiring about decoding capability information from a source device to a sink device, it does not define a message for inquiring about encoding capability from a sink device to a source device. This is because, generally in an existing technique, content encoding and decoding conditions are controlled mainly by source devices. On the other hand, in the present embodiment, a capability inquiry message from the sink device 100 to the source devices 200 for inquiring about an encoding capability is introduced as will be described below in detail. Accordingly, serving as a master, the sink device 100 can systematically control encoding conditions of the plurality of source devices 200.

An encoding condition may be a condition relating to at least one of a codec type, definition, a rate, and a quality level used in each source device 200. For example, when there is a free decoding circuit that supports H.264/AVC while decoding circuits that support H.265/HEVC are insufficient for a requirement, the reproduction control unit 160 can change an encoding condition of a source device 200 that is encoding content using H.265/HEVC to H.264/AVC. In addition, when processor performance of the decoding unit 130 is insufficient for a requirement, the reproduction control unit 160 can request that content be encoded using lower definition, a lower rate, or a lower quality level from the source devices 200. Accordingly, it is possible to adjust a required decoding capability to an actual decoding capability. Such a change of an encoding condition is allowed when encoding capability information indicates that a source device 200 has a capability of encoding or transmitting content under a changed encoding condition.

A codec type may include not only a compression encoding scheme but also a non-compression scheme. While a transfer in the non-compression scheme is performed only on a wireless connection in which a transfer rate is high because content to be transferred has a high bit rate, it imposes little burden on an encoder and a decoder in comparison to the compression encoding scheme. Thus, when a required decoding capability exceeds an actual decoding capability, the reproduction control unit 160 may request transmission of content without compression encoding from a source device 200 that is encoding the content using a specific codec type within a range that is permissible according to encoding capability information. The reproduction control unit 160 may switch a codec type to be applied to the source device 200 between the compression encoding scheme and the non-compression scheme according to a transfer rate or connection quality of an allocated frequency channel.

Upon deciding a change of an encoding condition (including a start or a stop of reproduction), the reproduction control unit 160 transmits a message for setting the decided encoding condition to a source device 200 that is involved with the change via the wireless communication unit 110. Whereas the above-described Wi-Fi Display Technical Specification does not define a message for seeking setting of an encoding condition from a sink device to a source device, the present embodiment introduces a setting request message for seeking setting of an encoding condition from the sink device 100 to the source devices 200.

As auxiliary control, the reproduction control unit 160 may control encoding conditions of each of the source devices 200 based on connection quality of wireless connections with each of the source devices 200. For example, the reproduction control unit 160 monitors a quality index input from the wireless communication unit 110 or the stream acquisition unit 120. Then, upon detecting that connection quality of a certain source device 200 is deteriorating, the reproduction control unit 160 lessens definition, a rate, or a quality level of content being received from the source device 200. Accordingly, since the bit rate of the content becomes lower, it is possible to reduce a risk of losing content data on a wireless connection whose quality has deteriorated.

In addition, the reproduction control unit 160 may control encoding conditions of each of the source devices 200 based on power supply states of each of the source devices 200. For example, in a state in which any content should be removed from a content reproduction set, the reproduction control unit 160 may remove content preferentially from a source device 200 which is being driven by a battery (or which has a smaller amount of remaining battery charge). In addition, the reproduction control unit 160 may preferentially lessen the definition, the rate, or the quality level of the content from the source device 200 which is being driven by a battery. The reproduction control unit 160 may decide a codec type for the source device 200 which is being driven by a battery so that decoding and re-encoding (or transcoding) of the content becomes unnecessary. Accordingly, overall battery consumption of the system can be suppressed along with lessening of the required decoding capability.

In addition, each source device 200 may provide prioritized condition information specifying an encoding condition to be prioritized to the sink device 100 through an advance message exchanging procedure. The prioritized condition information can be stored in the storage unit 170 and considered by the reproduction control unit 160 when encoding conditions of each of the source devices 200 are decided. By controlling the encoding conditions based on the prioritized condition information, it is possible to reflect a restriction on or a requirement (that is based on, for example, a user setting) for individual devices, for example, low power consumption or a reduction of a processing load on control.

In addition, the reproduction control unit 160 may further control frequency channels of wireless connections with the source devices 200 according to the encoding conditions of the source devices 200. For example, upon recognizing from an encoding condition that the bit rate of content to be received from a certain source device 200 is high, the reproduction control unit 160 allocates a frequency channel with a higher transfer rate (or better connection quality) to the wireless connection with the source device 200. In addition, when a transfer rate of a frequency channel that can be allocated is lower than a bit rate assumed for certain content, the reproduction control unit 160 may lessen definition, a rate, or a quality level of the content. Accordingly, stable content transfer can be secured.

The reproduction control unit 160 can also control exchange of messages between the source devices 200. The messages transmitted to the source devices 200 can include the above-described capability inquiry message and setting request message for controlling the encoding conditions of the source devices 200. Messages received from the source devices 200 can include response messages from the source devices 200 to the above-described capability inquiry message and setting request message. Further, the reproduction control unit 160 may transmit and receive control messages including commands relating to reproduction of content (for example, a start of reproduction, a stop of reproduction, fast-forwarding, rewinding, and the like) via a control channel between the devices. The reproduction control unit 160 can control operations of the video reproduction unit 140 and the audio reproduction unit 150 according to detection of such commands.

(7) Storage Unit

The storage unit 170 can store programs and data for controlling decoding and reproduction of content in the sink device 100. The storage unit 170 can store, for example, encoding capability information collected from the plurality of source devices 200 and the above-described prioritized condition information. In addition, the storage unit 170 can store actual decoding capability information indicating an actual decoding capability of the decoding unit 130. The actual decoding capability information may be fixedly defined beforehand. Instead, the reproduction control unit 160 may keep monitoring loads imposed on the decoding unit 130 to dynamically re-calculate an actual decoding capability of the decoding unit 130 and thereby to update the actual decoding capability information. When a decoding process is implemented by software, for example, there is a possibility of a processor that executes the software also executing other processes, and thus it is beneficial to dynamically re-calculate processor performance that can be used in decoding processes.

(8) User Interface Unit

The user interface unit 180 receives user inputs via an input device (not illustrated) of the sink device 100. The sink device 100 may receive input signals generated in unique hardware, for example, a remote controller, a touch panel, a keyboard, a mouse, a button, or a switch as user inputs. In addition, the sink device 100 may also receive audio commands acquired through a microphone, gesture commands acquired through a camera, or sensor commands acquired through a sensor as user inputs. The user interface unit 180 outputs received user inputs to the reproduction control unit 160.

3. CONFIGURATION EXAMPLE OF A SOURCE DEVICE

Figure 5:
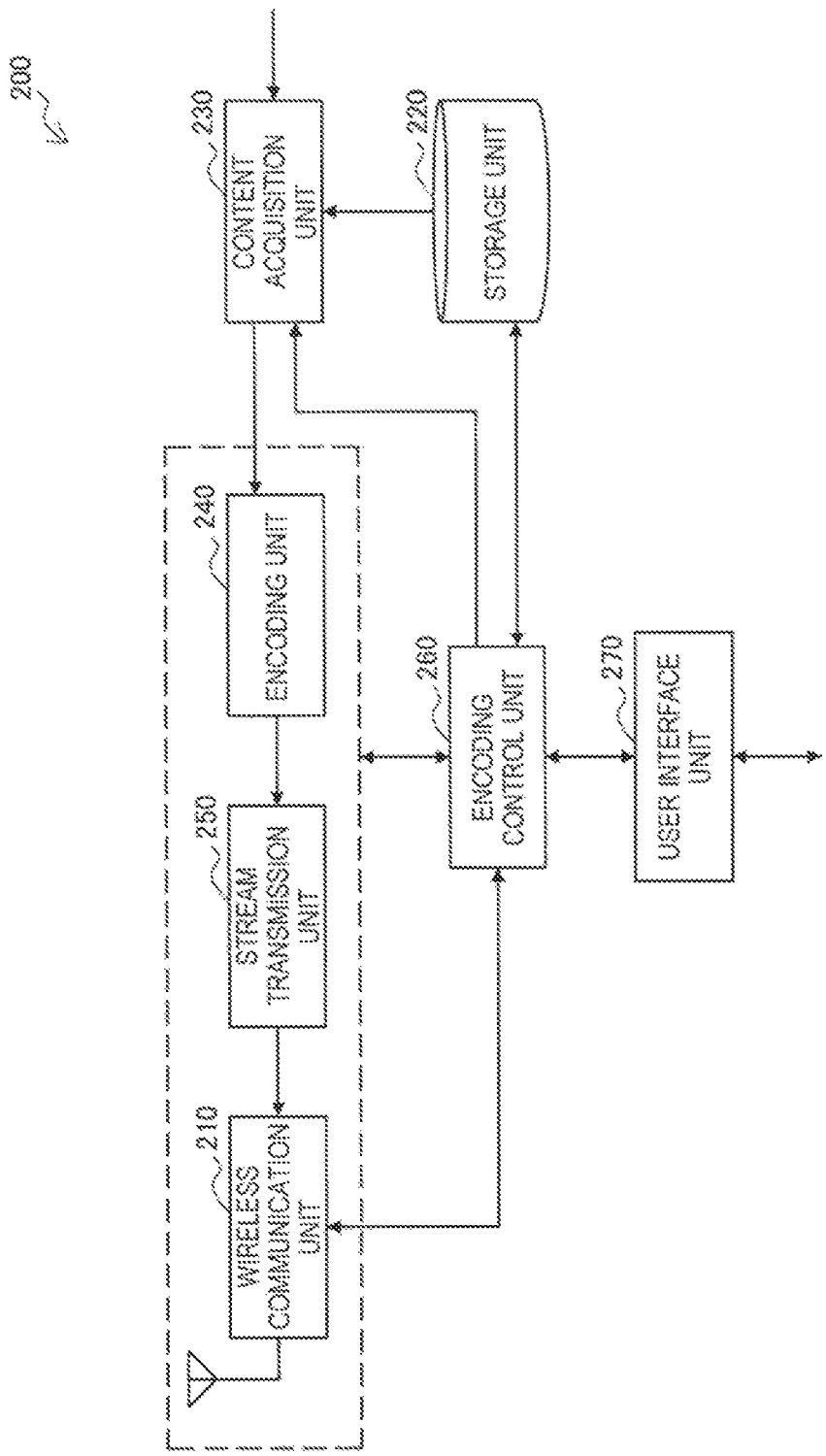
FIG. 5 is a block diagram showing an example of a configuration of a source device according to an embodiment.

FIG. 5 is a block diagram showing an example of a configuration of a source device 200 according to an embodiment. Referring to FIG. 5, the source device 200 is provided with a wireless communication unit 210, a storage unit 220, a content acquisition unit 230, an encoding unit 240, a stream transmission unit 250, an encoding control unit 260, and a user interface unit 270.

(1) Wireless Communication Unit

The wireless communication unit 210 is a wireless interface that mediates wireless communication of the source device 200 with another apparatus. In the present embodiment, the wireless communication unit 210 establishes wireless connections with the sink device 100. The sink device 100 is a decoding apparatus that decodes and reproduces content received from each of the plurality of source devices as described above. The wireless communication unit 110 transmits radio signals including content data generated by the stream transmission unit 250 to the sink device 100 on wireless connections through an antenna. In addition, the wireless communication unit 210 can also transmit and receive radio signals including control messages to and from the sink device 100. Control messages transmitted to the sink device 100 are generated by the encoding control unit 260 which will be described below. Furthermore, the control messages received from the sink device 100 are interpreted by the encoding control unit 260.

(2) Storage Unit

The storage unit 220 can store programs and data for controlling encoding and transmission of content in the source device 200. The storage unit 220 stores, for example, encoding capability information that indicates an encoding capability of the source device 200 in advance. The encoding capability information can indicate, for example, at least one of a codec type supported by the encoding unit 240, definition, a rate, and a quality level. An encoding condition can be designated within the range of an encoding capability indicated by the encoding capability information. In addition, the storage unit 220 may store prioritized condition information that specifies an encoding condition that is desired to be prioritized for the source device 200 (a prioritized condition). A prioritized condition is set by a user, or can be dynamically designated by the encoding control unit 260.

The storage unit 220 may further store any type of content that can be provided to the sink device 100. The storage unit 220 can store, for example, content that includes videos photographed using a camera and sounds collected using a microphone, content received from a broadcasting station and recorded, content downloaded from a content server, content read from a peripheral device, or content generated by any user application.

(3) Content Acquisition Unit

The content acquisition unit 230 acquires content to be provided to the sink device 100 from the storage unit 220 or other data sources, and outputs the acquired content to the encoding unit 240. Other data sources can include, for example, a camera and a microphone of the source device 200 or a remode device that the source device 200 can access (for example, a content server or a web camera with a microphone). What content should be provided to the sink device 100 can be designated through a user input detected by the user interface unit 270 or a control message received from the sink device 100. When acquired content has been encoded with a codec of a type that is different from an encoding condition designated by the sink device 100, the content acquisition unit 230 may decode the content first and output the content to the encoding unit 240.

(4) Encoding Unit

The encoding unit 240 encodes content to be transmitted to the sink device 100 input from the content acquisition unit 230 and thereby generates bit streams of the content. Then, the encoding unit 240 outputs the generated bit streams to the stream transmission unit 250. Encoding conditions of content of the encoding unit 240 are controlled by the encoding control unit 260 based on a control message received from the sink device 100. Encoding conditions for video content can include, for example, the codec type of a video codec in use, definition, a frame rate, and a level of image quality. Encoding conditions for audio content can include the codec type of an audio codec in use, a sampling rate, and a level of sound quality. When instructed not to perform compression encoding on content, the encoding unit 240 may generate bit streams of content in a non-compression format without compressing the content.

The encoding unit 240 may have one or more encoding circuits as hardware. In addition, the encoding unit 240 may have a processor that can execute software modules for video encoding and audio encoding. Furthermore, the encoding unit 240 may have both an encoding circuit as hardware and a processor that can execute the software modules. The encoding unit 240 can support any codec type.

(5) Stream Transmission Unit

The stream transmission unit 250 transmits bit streams of encoded content input from the encoding unit 240 to the sink device 100 via the wireless communication unit 210. The stream transmission unit 250 may generate multimedia streams by multiplexing streams of video content and streams of audio content and transmit the generated multimedia streams.

(6) Encoding Control Unit

The encoding control unit 260 controls encoding conditions of content of the encoding unit 240 based on a control message received from the sink device 100. The control message received from the sink device 100 designates an encoding condition decided such that a required decoding capability required for a set of content reproduced by the sink device 100 does not exceed an actual decoding capability of the sink device 100. For example, the encoding control unit 260 may cause the encoding unit 240 to encode video content according to a codec type, definition, a frame rate, and a level of image quality designated by the sink device 100. In addition, the encoding control unit 260 may cause the encoding unit 240 to encode audio content according to a codec type, a sampling rate, and a level of sound quality designated by the sink device 100.

In order to enable the sink device 100 to appropriately decide an encoding condition of the encoding unit 240, the encoding control unit 260 transmits encoding capability information indicating an encoding capability of the encoding unit 240 to the sink device 100 via the wireless communication unit 210. For example, in response to a capability inquiry message received from the sink device 100, the encoding control unit 260 may transmit encoding capability information to the sink device 100. In existing techniques, source devices inquire about decoding capabilities from sink devices, and the source devices mainly decide content encoding and decoding conditions based on the results. On the other hand, in the present embodiment, a capability inquiry message from the sink device 100 to the source devices 200 for inquiring about an encoding capability and a response message including encoding capability information with which the source devices 200 reply to the sink device 100 in response to the capability inquiry message are introduced. Accordingly, serving as a master, the sink device 100 can systematically control encoding conditions of the plurality of source devices 200.

Another control message that can be received from the sink device 100 designates an encoding condition within the range indicated by the encoding capability information transmitted to the sink device 100. The control message may be a setting request message described above for requesting setting of an encoding condition from the sink device 100 to the source devices 200. When allowed according to the encoding capability information, the setting request message may designate the non-compression scheme as a codec type. When the non-compression scheme is designated as a codec type, the encoding control unit 260 can instruct the encoding unit 240 to generate bit streams of content in the non-compression format without compressing the content. When content acquired by the content acquisition unit 230 has already been encoded in the codec type designated by the setting request message, the encoding control unit 260 may skip decoding and re-encoding (or transcoding) of the content.

In addition, the encoding control unit 260 may notify the sink device 100 of power supply states of the source devices 200 (for example, whether they are driven by batteries or connected to a power supply, the remaining amount of battery charge, or the like). In this case, the sink device 100 can control an encoding condition of the source devices 200 in order to suppress consumption of the batteries of the source devices 200 that are, for example, driven by the batteries, based further on the power supply states of the source devices 200.

In addition, the encoding control unit 260 may transmit prioritized condition information that specifies an encoding condition to be prioritized to the sink device 100 through an advance message exchanging procedure. The prioritized condition information is defined based on a restriction on or a requirement for individual devices, for example, low power consumption or a reduction of a processing load, and can be considered when the sink device 100 decides an encoding condition of the source devices 200.

In addition, the encoding control unit 260 may further control frequency channels for wireless connections with the sink device 100 according to control of the sink device 100. When the bit rate of content to be transmitted to the sink device 100 is recognized to be increasing, a frequency channel with a higher transfer rate (or better connection quality) is allocated to a wireless connection with the sink device 100. The encoding control unit 260 can instruct the wireless communication unit 210 to use the frequency channel allocated by the sink device 100. The encoding control unit 260 may measure a quality index for evaluating connection quality of a wireless connection with the sink device 100 (for example, a BER, a PER, or the like) and transmit the quality index to the sink device 100.

The encoding control unit 260 can also control exchange of the messages to and from the sink device 100. Messages received from the sink device 100 can include the above-described capability inquiry message and setting request message for controlling encoding conditions of the source devices 200. Messages transmitted to the sink device 100 can include response messages to the above-described capability inquiry message and setting request message. Furthermore, when a user input to the user interface unit 270 relating to reproduction of content is detected, the encoding control unit 260 may transmit a control message including a command corresponding to the detected user input to the sink device 100 via a control channel between the devices.

For example, when a source device 200 is selected as an idle device, a control message instructing a stop of reproduction of content can be received by the wireless communication unit 210 thereof. In this case, the encoding control unit 260 may cause an operation mode of the source device 200 to transition to a standby mode and partially stop power supply to each unit of the source device 200 during the period of the standby mode. In the standby mode, the wireless communication unit 210 can operate, for example, intermittently, and can receive control messages from the sink device 100 in active periods periodically. In other words, a wireless connection between the sink device 100 and the source device 200 can be maintained during the period of the standby mode as well. Upon receiving a control message instructing a start of reproduction of content during the period of the standby mode, the encoding control unit 260 can return the operation mode of the source device 200 to an active mode.

(7) User Interface Unit

The user interface unit 270 receives user inputs via input devices (not illustrated) of the source devices 200. The source devices 200 may receive input signals generated in unique hardware, for example, a remote controller, a touch panel, a keyboard, a mouse, a button, a switch, or the like as user inputs. In addition, the source devices 200 may receive sound commands acquired through a microphone, gesture commands acquired through a camera, or sensor commands acquired through a sensor as user inputs. The user interface unit 270 outputs received user inputs to the encoding control unit 260.

Although not illustrated in FIG. 5, the source devices 200 each may also have a video reproduction unit and an audio reproduction unit.

4. PROCESS FLOW

4-1. Process on a Sink Side (1) Content Reproduction Process

Figure 6:
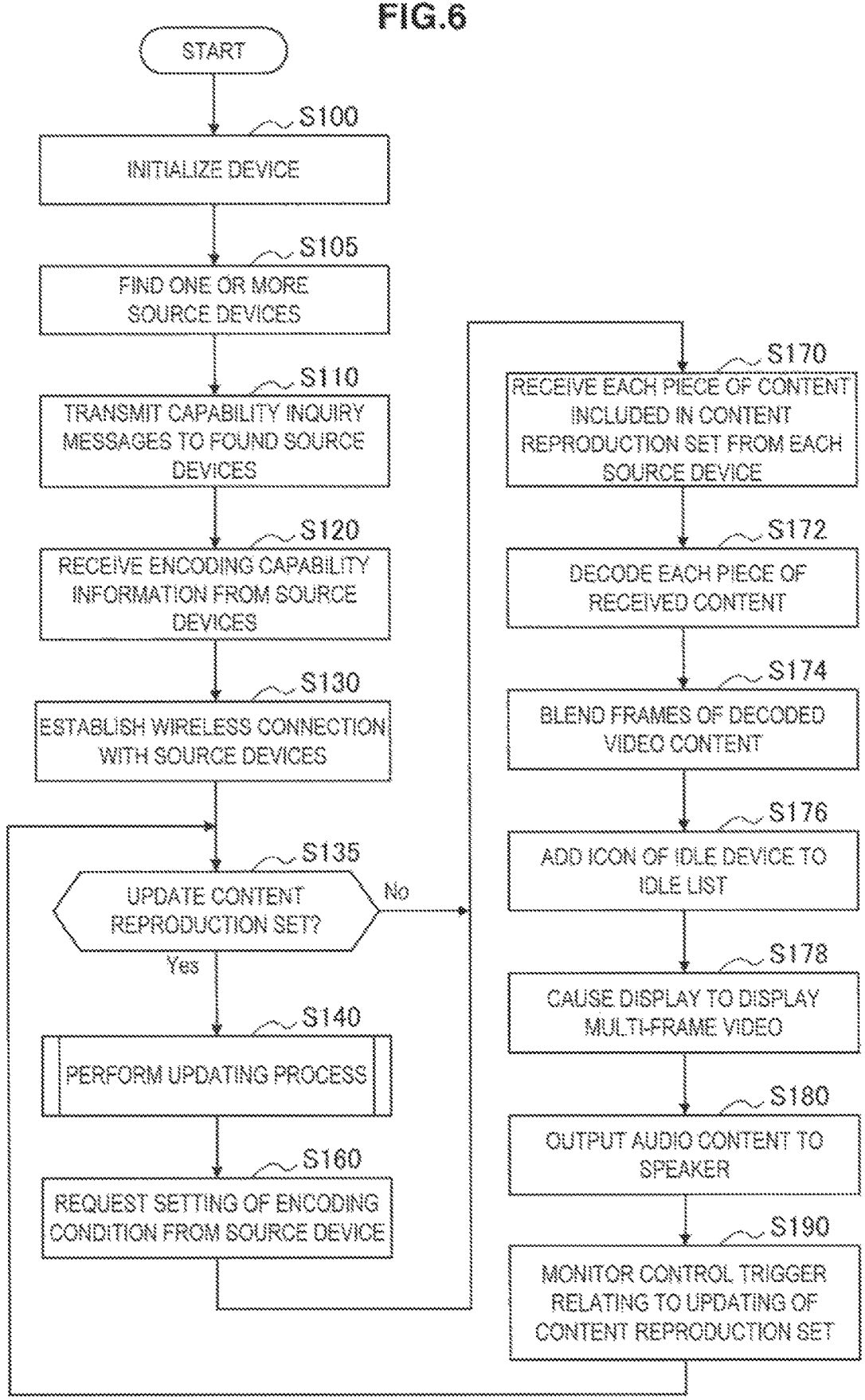
FIG. 6 is a flowchart showing an example of the flow of a content reproduction process executed by a sink device according to an embodiment.

FIG. 6 is a flowchart showing an example of the flow of a content reproduction process executed by the sink device 100 according to the present embodiment.

Referring to FIG. 6, first, the reproduction control unit 160 of the sink device 100 initializes each unit of the sink device 100 (Step S100). Next, the reproduction control unit 160 finds one or more source devices 200 present in its periphery by broadcasting search signals to the periphery of the sink device 100 from the wireless communication unit 110 or by detecting search signals broadcast from the source devices 200 (Step S105). Next, the reproduction control unit 160 transmits capability inquiry messages from the wireless communication unit 110 to the found source devices 200 (Step S110). Then, the reproduction control unit 160 receives encoding capability information with which the source devices 200 reply in response to the capability inquiry messages (Step S120). Then, the reproduction control unit 160 establishes a wireless connection with the source devices 200 by which content can be provided (Step S130). Note that the processes from Step S105 to S130 may be continuously repeated while content reproduction control to be described below is executed. Each time a new source device 200 is found, the sink device 100 can establish a wireless connection with the found source device 200.

Thereafter, reproduction of content is triggered according to, for example, a user input. First, the reproduction control unit 160 determines whether to update a content reproduction set (Step S135). For example, the reproduction control unit 160 adds content that has been designated as main content or sub content by a user to the content reproduction set. The updating process of Step S140 for updating the content reproduction set will be described below in detail. When an encoding condition of content to be reproduced is changed through the updating process here, the reproduction control unit 160 requests setting of an encoding condition by transmitting a setting request message to the source device 200 having a change in its encoding condition (Step S160).

Then, when provision of content starts, the wireless communication unit 110 receives each piece of content included in the content reproduction set from each of the plurality of source devices 200 (Step S170). Bit streams of each piece of content can be extracted from reception signals by the stream acquisition unit 120. Next, the decoding unit 130 decodes each piece of main content and sub content from the bit streams of the received content (Step S172). Next, the video reproduction unit 140 blends frames of the decoded video content into a multi-frame display image (Step S174). In addition, when there is a source device 200 selected as an idle device, the video reproduction unit 140 adds an icon (or text) of the idle device to an idle list displayed in the display image (Step S176). Then, the video reproduction unit 140 causes a display to display the multi-frame video (Step S178). In addition, the audio reproduction unit 150 outputs the decoded audio content to a speaker (Step S180).

During the content reproduction process described above, the reproduction control unit 160 monitors a control trigger relating to updating of the content reproduction set (Step S190). The control trigger referred to here can include at least one of, for example, detection of a user input instructing updating of the content reproduction set, an increase of a load imposed on the decoding unit 130, and deterioration of connection quality of a wireless connection. When no control trigger is detected, the processes of Step S140 and S160 described above are skipped, and reception, decoding, and reproduction of the content from the source device 200 are repeated. When a control trigger is detected, an updating process for updating the content reproduction set to be described next can be executed.

(2) Reproduction Set Updating Process

Figure 7:
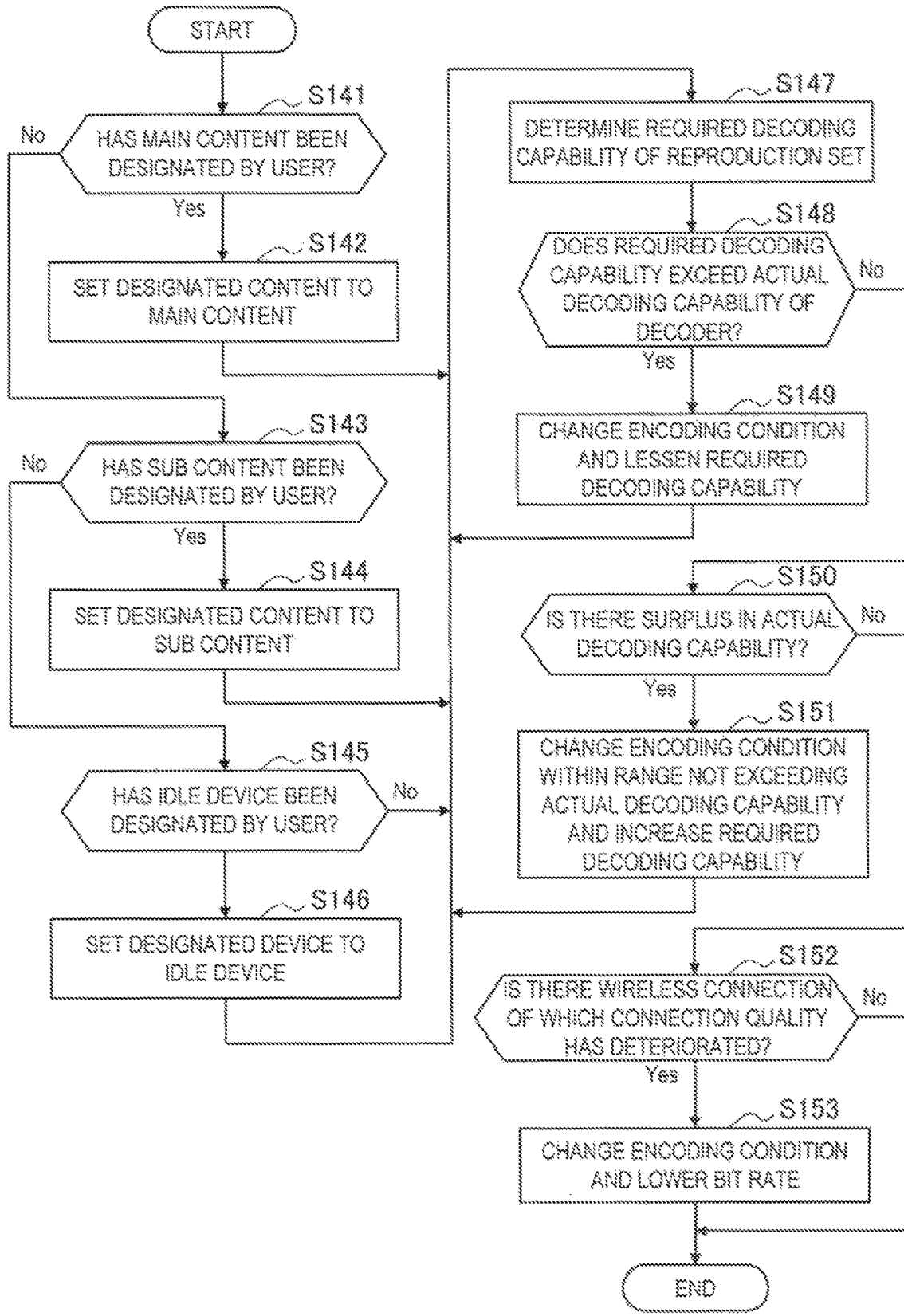
FIG. 7 is a flowchart showing an example of the detailed flow of an updating process for updating a content reproduction set.

FIG. 7 is a flowchart showing an example of the detailed flow of the updating process for updating the content reproduction set which corresponds to Step S140 of FIG. 6.

The updating process shown in FIG. 7 branches depending on details of user inputs. For example, when main content has been designated by a user (Step S141), the reproduction control unit 160 sets the designated content to main content (Step S142). In addition, when sub content has been designated by the user (Step S143), the reproduction control unit 160 sets the designated content to sub content (Step S144). In addition, when an idle device has been designated by the user (Step S145), the reproduction control unit 160 sets a designated source device 200 to an idle device (Step S146).

Next, the reproduction control unit 160 determines a required decoding capability of the reproduction set (Step S148). For example, a required decoding capability for video content can depend on a codec type, definition, a frame rate, and a level of image quality of video content to be reproduced. A required decoding capability for audio content can depend on a codec type, a sampling rate, and a level of sound quality of audio content to be reproduced. A required decoding capability may be expressed by the number of necessary decoding circuits or necessary processor performance.

Next, the reproduction control unit 160 determines whether or not the determined required decoding capability exceeds an actual decoding capability of the decoding unit 130 (Step S148). When the required decoding capability exceeds the actual decoding capability of the decoding unit 130, the reproduction control unit 160 changes an encoding condition of the content reproduction set and lessens the required decoding capability (Step S149). The change of the encoding condition may include, for example, one or more of the following items a1) to a9) within the range that is permissible according to encoding capability information acquired from each of the source devices 200.

a1) Change of main content to sub content
a2) Stop of reproduction of main content (a change to an idle device)
a3) Stop of reproduction of sub content (a change to an idle device)
a4) Change of a codec type (a change to a lightweight compression encoding scheme or to a non-compression scheme)
a5) Reduction of definition of video content
a6) Reduction of the frame rate of video content
a7) Reduction of the level of image quality of video content
a8) Reduction of the sampling rate of audio content
a9) Reduction of the level of sound quality of audio content Thereafter, the reproduction control unit 160 executes the determination of a required decoding capability and the comparison of the determined required decoding capability to the actual decoding capability again.

When the required decoding capability does not exceed the actual decoding capability of the decoding unit 130 and there is a surplus in the actual decoding capability (Step S150), the reproduction control unit 160 may change the encoding condition within the range not exceeding the actual decoding capability and increase the required decoding capability (Step S151). The change of an encoding condition referred to here may include, for example, one or more of the following items b1) to b9) within the range that is permissible according to the encoding capability information acquired from each of the source devices 200.

b1) Change of sub content to main content
b2) Start of reproduction of main content from an idle device
b3) Start of reproduction of sub content from an idle device
b4) Change of a codec type
b5) Increase of definition of video content
b6) Increase of the frame rate of video content
b7) Increase of the level of image quality of video content
b8) Increase of the sampling rate of audio content
b9) Increase of the level of sound quality of audio content Thereafter, the reproduction control unit 160 executes the determination of a required decoding capability and the comparison of the determined required decoding capability to the actual decoding capability again.

When the required decoding capability does not exceed the actual decoding capability of the decoding unit 130 and use of a surplus of the actual decoding capability is not demanded, the process proceeds to Step S152. Here, the reproduction control unit 160 determines whether there is a wireless connection of which the connection quality has deteriorated (Step S152). For example, when the transfer rate of a certain wireless connection is lower than the bit rate of content to be carried, the connection quality of the wireless connection can be determined to have deteriorated. When there is a wireless connection of which the connection quality has deteriorated, the reproduction control unit 160 changes an encoding condition and lowers the bit rate of corresponding content (Step S153). Note that the change of the encoding condition according to the connection quality of the wireless connection may not necessarily be executed or may be executed by a source device 200 on the transmission side.

4-2. Process on a Source Side

Figure 8:
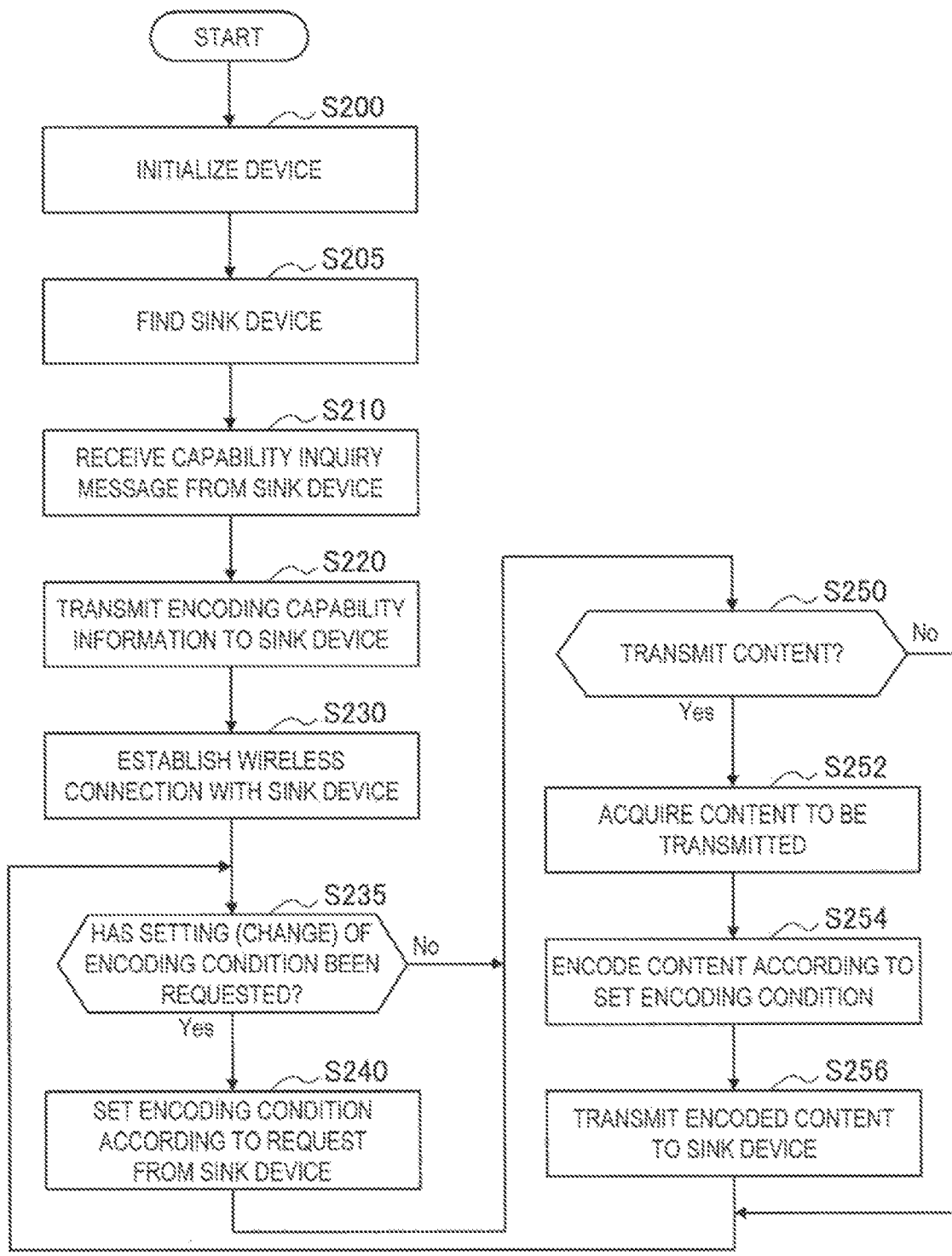
FIG. 8 is a flowchart showing an example of the flow of a content transmission process executed by a source device according to an embodiment.

FIG. 8 is a flowchart showing an example of the flow of a content transmission process executed by the source device 200 according to the present embodiment.

Referring to FIG. 8, first, the encoding control unit 260 of the source device 200 initializes each unit of the source device 200 (Step S200). Next, the encoding control unit 260 finds the sink device 100 by detecting a search signal broadcast from the sink device 100 or broadcasting a search signal from the wireless communication unit 210 (Step S205). Next, the encoding control unit 260 receives a capability inquiry message from the sink device 100 via the wireless communication unit 210 (Step S210). Then, in response to the capability inquiry message, the encoding control unit 260 transmits a response message including encoding capability information to the sink device 100 (Step S220). Then, the encoding control unit 260 establishes a wireless connection with sink device 100 (Step S230).

Thereafter, when the sink device 100 requests setting of an encoding condition (Step S235), the encoding control unit 260 sets an encoding condition for encoding content according to the request (Step S240). The encoding condition is described in, for example, a setting request message received from the sink device 100.

Then, according to a request from the sink device 100, for example, transmission of content is triggered (Step S250). First, the content acquisition unit 230 acquires content to be transmitted to the sink device 100 from the storage unit 220 or another data source (Step S252). Next, the encoding unit 240 encodes content input from the content acquisition unit 230 according to the encoding condition set by the encoding control unit 260 (Step S254). Next, the stream transmission unit 250 transmits bit streams of the encoded content input from the encoding unit 240 to the sink device 100 via the wireless communication unit 210 (Step S256).

During the content transmission process described above, the encoding control unit 260 monitors a control trigger. The control trigger mentioned here can include, for example, reception of the setting request message from the sink device 100 and detection of a user input to the user interface unit 270. When the control trigger requests a change of an encoding condition, the encoding control unit 260 can re-set the encoding condition in Step S240 described above according to the request. When no control trigger is detected, acquisition, encoding, and transmission of the content are repeated. Note that acquisition, encoding, and transmission of the content are skipped while the source device 200 is selected as an idle device.

5. CONTROL SCENARIOS

In this section, several control scenarios relating to control of encoding conditions in the content reproduction system 1 will be described using drawings.

(1) First Control Scenario

FIG. 9 is an illustrative diagram for describing an exemplary first control scenario relating to control of an encoding condition. In the upper part of FIG. 9, a content reproduction set RL10 and display images corresponding thereto are shown. The content reproduction set RL10 includes main content from the source device 200a (whose identifier is "DVC1") and two pieces of sub content from the source device 200b (whose identifier is "SMP1") and the source device 200c (whose identifier is "VDR1"). The source device 200d (whose identifier is "TBL1") is an idle device. Content received from the source device 200a is displayed in the main window 145a for a display image. Content received from the source device 200b is displayed in the sub window 145b. Content received from the source device 200c is displayed in the sub window 145c. The icon of the source device 200d that is an idle device is displayed in the idle device window 146.

Here, it is assumed that, for example, a user has instructed via a graphical user interface (GUI) displayed on a screen that content from the source device 200d be displayed content in the main window 145a. Then, the reproduction control unit 160 of the sink device 100 updates the content reproduction set RL10 to a content reproduction set RL11. In the content reproduction set RL11, content from the source device 200d (whose identifier is "TBL1") is set to main content. However, since the decoding unit 130 has, for example, only three decoding circuits that can decode video content, a required decoding capability for the content reproduction set RL11 exceeds the actual decoding capability of the decoding unit 130.

Thus, the reproduction control unit 160 updates the content reproduction set RL11 to, for example, content reproduction set RL12. In the content reproduction set RL12, content from the source device 200a (whose identifier is "DVC1") is removed from the reproduction targets, and the source device 200a is changed to an idle device. As a result, the required decoding capability for the content reproduction set RL12 does not exceed the actual decoding capability of the decoding unit 130. In the lower part of FIG. 9, display images corresponding to the content reproduction set RL12 are shown. Content received from the source device 200d (whose identifier is "TBL1") is displayed in the main window 145a. On the other hand, the icon of the source device 200a is displayed in the idle device window 146. A wireless connection between the wireless communication unit 110 and the source device 200a is maintained even after the source device 200a is expressed as an icon as described above. Accordingly, it is possible to shorten a time delayed up to a start of reproduction (for example, a time taken for setting up a wireless connection) when content from the source device 200a is reproduced again.

(2) Second Control Scenario

FIG. 10 is an illustrative diagram for describing an exemplary second control scenario relating to control of an encoding condition. In the upper part of FIG. 10, a content reproduction set RL20 and display images corresponding thereto are shown. The content reproduction set RL20 includes main content from the source device 200a (whose identifier is "DVC1") and two pieces of sub content from the source device 200b (whose identifier is "SMP1") and the source device 200c (whose identifier is "VDR1"). The source device 200d (whose identifier is "TBL1") is an idle device. Content received from the source device 200a is displayed in the main window 145a for a display image. Content received from the source device 200b is displayed in the sub window 145b. Content received from the source device 200c is displayed in the sub window 145c. The icon of the source device 200d that is an idle device is displayed in the idle device window 146.

Here, it is assumed that, for example, a user has instructed via a user interface of the source device 200b that content from the source device 200b be displayed in the main window 145a. Then, the reproduction control unit 160 of the sink device 100 updates the content reproduction set RL20 to a content reproduction set RL21. In the content reproduction set RL21, content from the source device 200b (whose identifier is "SMP1") is set to main content. However, when it is attempted to simultaneously decode two pieces of main content that require high definition, a required decoding capability exceeds the actual decoding capability of the processor of the decoding unit 130. As an example, 50%, 20%, and 2% of processor performance are assumed to be necessary for reception and decoding of main content, reception and decoding of sub content, and maintaining a wireless connection, respectively. In this case, if the two pieces of main content are decoded in parallel, the required decoding capability reaches 100%, and thus processor performance can be insufficient. The required decoding capability may be calculated in association with an encoding condition with simplicity as above.

Thus, the reproduction control unit 160 updates the content reproduction set RL21 to, for example, content reproduction set RL22. In the content reproduction set RL22, content from the source device 200a (whose identifier is "DVC1") is changed to sub content. As a result, the required decoding capability for the content reproduction set RL22 does not exceed the actual decoding capability of the decoding unit 130. In the lower part of FIG. 10, display images corresponding to the content reproduction set RL22 are shown. Content received from the source device 200b (whose identifier is "SMP1") is displayed in the main window 145a. On the other hand, content received from the source device 200a (whose identifier is "DVC1") is displayed in the sub window 145b.

(3) Third Control Scenario

FIG. 11 is an illustrative diagram for describing an exemplary third control scenario relating to control of an encoding condition. In the upper part of FIG. 11, a content reproduction set RL30 and display images corresponding thereto are shown. The content reproduction set RL30 includes main content from the source device 200a (whose identifier is "DVC1") and two pieces of sub content from the source device 200b (whose identifier is "SMP1") and the source device 200c (whose identifier is "VDR1"). The source device 200d (whose identifier is "TBL1") is an idle device. Content received from the source device 200a is displayed in the main window 145a for a display image. Content received from the source device 200b is displayed in the sub window 145b. Content received from the source device 200c is displayed in the sub window 145c. The icon of the source device 200d that is an idle device is displayed in the idle device window 146.

Here, it is assumed that, for example, a user has instructed via a GUI displayed on a screen that content from the source device 200d be displayed in the sub window 145b or 145c. Then, the reproduction control unit 160 of the sink device 100 updates the content reproduction set RL30 to content reproduction set RL31. In the content reproduction set RL31, content from the source device 200d (whose identifier is "TBL1") is set to sub content. However, if it is attempted to simultaneously decode one piece of main content and three pieces of sub content with current definition, the required decoding capability exceeds the actual decoding capability of the processor of the decoding unit 130.

Thus, the reproduction control unit 160 updates the content reproduction set RL31 to, for example, content reproduction set RL32. In the content reproduction set RL32, the definition of sub content from the source device 200b (whose identifier is "SMP1") and the source device 200c (whose identifier is "VDR1") is changed to low definition (LD). As a result, the required decoding capability for the content reproduction set RL32 does not exceed the actual decoding capability of the decoding unit 130. In the lower part of FIG. 11, display images corresponding to the content reproduction set RL32 are displayed. The window sizes of the sub window 145b and 145c are reduced, and these windows each display sub content of the low definition. In addition, a new sub window 145d is added, and the sub window 145d displays content received from the source device 200d (whose identifier is "TBL1"). As described above, a window configuration of display images (such as the number and the sizes of windows) may be dynamically changed according to an encoding condition of a content reproduction set.

(4) Fourth Control Scenario

FIG. 12 is an illustrative diagram for describing an exemplary fourth control scenario relating to control of an encoding condition. In the upper part of FIG. 12, a content reproduction set RL40 and display images corresponding thereto are shown. The content reproduction set RL40 includes main content from the source device 200a (whose identifier is "DVC1") and two pieces of sub content from the source device 200b (whose identifier is "SMP1") and the source device 200c (whose identifier is "VDR1"). The source device 200d (whose identifier is "TBL1") is an idle device. The main content is encoded with H.265/HEVC in the source device 200a. The two pieces of sub content are encoded with H.264/AVC in the source devices 200b and 200c.

Here, it is assumed that, for example, a user has instructed via a GUI displayed on a screen that content from the source device 200d be displayed content in the main window 145a. Then, the reproduction control unit 160 of the sink device 100 updates the content reproduction set RL40 to a content reproduction set RL41. In the content reproduction set RL41, content from the source device 200d (whose identifier is "TBL1") is set to main content. However, since the decoding unit 130 has, for example, only three decoding circuits that can decode video content, a required decoding capability for the content reproduction set RL41 exceeds the actual decoding capability of the decoding unit 130.

Thus, the reproduction control unit 160 further updates the content reproduction set RL41 to content reproduction set RL42. In the content reproduction set RL42, content from the source device 200a (whose identifier is "DVC1") is set to sub content, and content from the source device 200c (whose identifier is "VDR1") is removed from the reproduction targets. The main content from the source device 200d (whose identifier is "TBL1") is encoded with H.265/HEVC. However, since the decoding unit 130 has only one decoding circuit that can decode video content with H.265/HEVC, for example, the required decoding capability for the content reproduction set RL42 still exceeds the actual decoding capability of the decoding unit 130.

Thus, the reproduction control unit 160 further updates the content reproduction set RL42 to, for example, content reproduction set RL43. In the content reproduction set RL43, the main content of the source device 200d (whose identifier is "TBL1") is encoded with H.264/AVC. As a result, the required decoding capability for the content reproduction set RL43 does not exceed the actual decoding capability of the decoding unit 130. Which source device has the codec type to be changed may be decided based on, for example, encoding capability information collected from each of the source devices in advance. In the control scenario of FIG. 12, the reason for changing the codec type for the main content of the source device 200d to H.264/AVC may be that, while the source device 200d supports both H.265/HEVC and H.264/AVC, the source device 200a supports only H.265/HEVC.

(5) Fifth Control Scenario

FIG. 13 is an illustrative diagram for describing an exemplary fifth control scenario relating to control of an encoding condition. In the upper part of FIG. 13, a content reproduction set RL50 and display images corresponding thereto are shown. The content reproduction set RL50 includes main content from the source device 200a (whose identifier is "DVC1") and two pieces of sub content from the source device 200b (whose identifier is "SMP1") and the source device 200c (whose identifier is "VDR1"). The source device 200d (whose identifier is "TBL1") is an idle device.

Here, it is assumed that, for example, a user has instructed via a GUI displayed on a screen that content from the source device 200d be displayed content in the main window 145a. Then, the reproduction control unit 160 of the sink device 100 updates the content reproduction set RL50 to a content reproduction set RL51. In the content reproduction set RL51, content from the source device 200d (whose identifier is "TBL1") is set to main content. However, for example, since the decoding unit 130 has only three decoding circuits that can decode video content and there is only one decoding circuit that can decode content with H.265/HEVC that is a given video codec for the main content, the required decoding capability for the content reproduction set RL51 exceeds the actual decoding capability of the decoding unit 130.

Thus, the reproduction control unit 160 updates the content reproduction set RL51 to, for example, content reproduction set RL52. In the content reproduction set RL52, content from the source device 200a (whose identifier is "DVC1") is changed to sub content, and the codec type of the content is changed to a non-compression (NC) scheme. In this case, the source device 200a transmits the content to the sink device 100 without performing compression encoding thereon. The decoding unit 130 of the sink device 100 may not execute a decoding process for decompressing the sub content received from the source device 200a. As a result, the required decoding capability for the content reproduction set RL52 does not exceed the actual decoding capability of the decoding unit 130. In the lower part of FIG.

13, display images corresponding to the content reproduction set RL52 are shown. In the display images, a new sub window 145e is added, and the sub window 145e is displaying content received from the source device 200a (whose identifier is "DVC1").

6. MESSAGING SEQUENCES (EXAMPLES OF WI-FI DISPLAY)

In this section, several examples of messaging sequences between the sink device 100 and a source device 200 of the content reproduction system 1 will be described using drawings. Here, as an example rather than a limitation, the messaging sequences are set to comply with the Wi-Fi Display Technical Specifications, and the sequences can be extended in parts to realize the technology according to the present disclosure.

[6-1. Schematic Flow]

Figure 14:
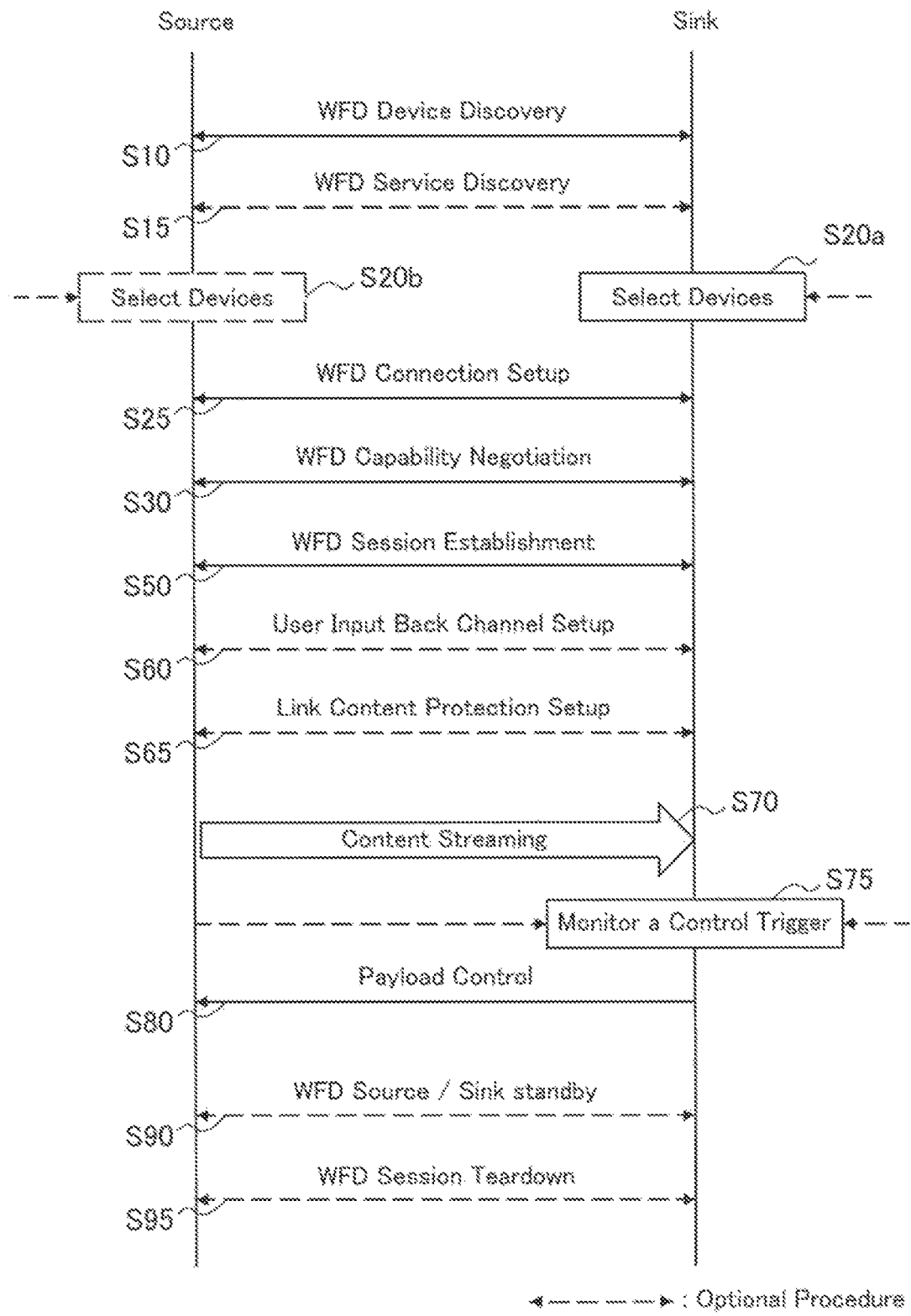
FIG. 14 is a sequence diagram schematically showing the flow of messaging between devices in Wi-Fi Display.

FIG. 14 is a sequence diagram schematically showing the flow of messaging between devices in Wi-Fi Display. Note that only one source device and one sink device are shown in the drawing for the sake of simplification of description. However, in practice, a plurality of source devices and one sink device can exchange messages according to the procedure described in this section.

Referring to FIG. 14, first, a device discovery procedure (WFD Device Discovery) is executed between the sink device 100 and the source device 200 (Step S10). In the device discovery procedure, at least one device transmits a search signal, and the other device that receives the search signal replies with a response signal. Accordingly, the sink device 100 and the source device 200 recognize each other.

Next, a service discovery procedure (WFD Service Discovery) is executed between the sink device 100 and the source device 200 (Step S15). Note that the service discovery procedure is optional and may be omitted from the sequence. In the service discovery procedure, at least one device transmits a service inquiry signal, and the other device that receives the service inquiry signal replies with a service response signal. In a second technique to be described below in detail, encoding capability information of the source device 200 is provided to the sink device 100 during this service discovery procedure.

Next, the sink device 100 selects the source device 200 to be connected to among found devices (Step S20a). The selection of the device may be performed according to a user input or performed according to a local policy stored in advance. Similarly, the source device 200 may also select the sink device 100 to be connected (Step S20b).

Next, a connection setup procedure (WFD Connection Setup) is executed between the sink device 100 and the source device 200 (Step S25). Accordingly, a TCP connection is established between the devices. Typically, the sink device 100 starts the connection setup procedure as a TCP client, and the source device 200 operates as a TCP server.

Next, a capability negotiation procedure (WFD Capability Negotiation) is executed between the sink device 100 and the source device 200 (Step S30). In a first technique to be described below in detail, encoding capability information of the source device 200 is provided to the sink device 100 during this capability negotiation procedure. The capability negotiation procedure can be implemented using M1, M2, M3, and M4 messages of the Real Time Streaming Protocol (RTSP) or extensions thereof.

Next, a session establishment procedure (WFD Session Establishment) is executed between the sink device 100 and the source device 200 (Step S50). Accordingly, a service session is established between the devices. The session establishment procedure can be implemented using M5, M6, and M7 messages of the RTSP.

Next, a UIBC setup procedure is executed between the sink device 100 and the source device 200 (Step S60). Note that the UIBC setup procedure is optional, and thus may be omitted from the sequence. Through the UIBC setup procedure, a control channel for transmitting user input information is established between the devices. The UIBC setup procedure can be implemented using the M3 and M4 messages or M14 and M15 messages of the RTSP.

Next, a content protection setup procedure is executed between the sink device 100 and the source device 200 (Step S65). Note that the content protection setup procedure is optional and thus may be omitted from the sequence. Through the content protection setup procedure, content can be protected with, for example, a High-bandwidth Digital Content Protection (HDCP) technology.

Thereafter, streaming of content from the source device 200 to the sink device 100 is executed (Step S70). The streaming here can correspond to, for example, the processes of Steps S252 to S256 of FIG. 8 and Steps S170 to S180 of FIG. 6. When any control trigger is detected during the streaming (Step S75), the sink device 100 executes control according to the detected control trigger (Step S80). For example, updating of a content reproduction set and an instruction of a new encoding condition caused thereby to the source device 200 may be performed here.

Next, when the source device 200 is selected as an idle device, a standby transition procedure (WFD Source/Sink standby) can be executed between the sink device 100 and the source device 200 (Step S90). When the service ends, a session closing procedure (WFD Session Teardown) can be executed between the sink device 100 and the source device 200 (Step S95).

[6-2. Existing Capability Negotiation Procedure]

Figure 15:
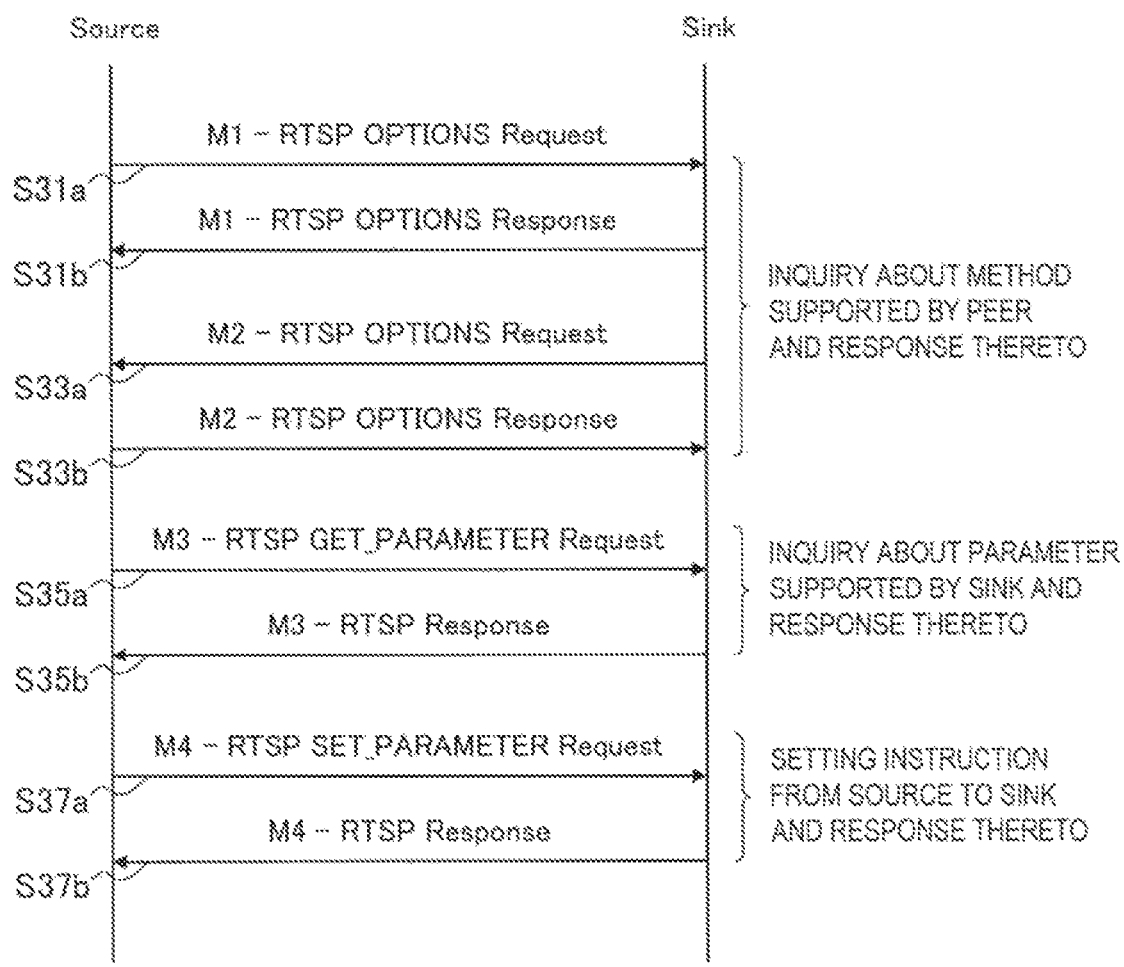
FIG. 15 is a sequence diagram showing an example of the flow of existing messaging in a capability negotiation procedure of FIG. 14.

FIG. 15 is a sequence diagram showing an example of the flow of existing messaging in the capability negotiation procedure of FIG. 14. According to Non-Patent Literature 1, the capability negotiation procedure (WFD Capability Negotiation) is implemented using the M1, M2, M3, and M4 messages of the RTSP in Wi-Fi Display.

First, the source device transmits an M1 request message (M1-RTSP OPTIONS Request) to the sink device to inquire about a method that the sink device supports (Step S31a). In response to the M1 request message, the sink device replies with an M1 response message (M1-RTSP OPTIONS Response) (Step S31b).

Next, the sink device transmits an M2 request message (M2-RTSP OPTIONS Request) to the source device to inquire about a method that the source device supports (Step S33a). In response to the M2 request message, the source device replies with an M2 response message (M2-RTSP OPTIONS Response) (Step S33b).

Next, the source device transmits an M3 request message (M3-RTSP GET_PARAMETER Request) to the sink device to acquire a parameter indicating a decoding capability of the sink device (Step S35a). In response to the M3 request message, the sink device replies with an M3 response message (M3-RTSP Response) (Step S35b).

Next, the source device transmits an M4 request message (M4-RTSP SET_PARAMETER Request) to the sink device to instruct setting of a decoding condition to the sink device (Step S37a). In response to the M4 request message, the sink device replies with an M4 response message (M4-RTSP Response) (Step S37b).

As described above, in the existing messaging sequence, the source device has a role of a master controlling content encoding and decoding conditions, and the sink device sets a decoding condition according to instructions from the source device. On the other hand, in the present embodiment, the sink device 100 has a role of a master controlling content encoding and decoding conditions. Two examples of extended messaging sequences for the embodiment will be described below.

[6-3. Extended Messaging Sequences (A First Technique)]
(1) Basic Flow

Figure 16:
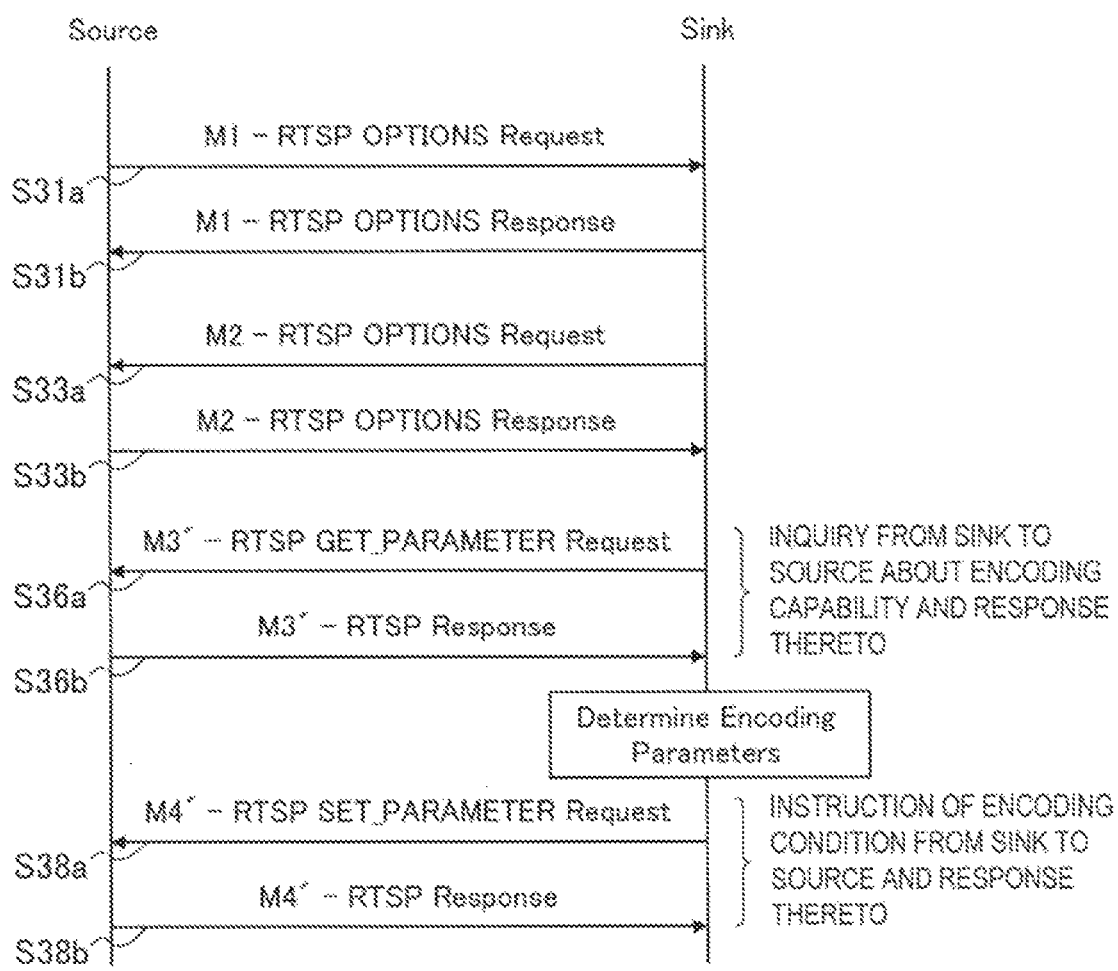
FIG. 16 is a sequence diagram showing an example of the flow of extended messaging between the sink device and the source device according to a first technique.

FIG. 16 is a sequence diagram showing an example of the flow of extended messaging between the sink device and the source device according to the first technique. In the first technique, an M3 request message that is a message for acquiring a parameter of the RTSP is extended and used as a capability inquiry message from the sink device 100 to the source device 200 for inquiring about encoding capability information. In addition, an M4 request message that is a message for setting a parameter of the RTSP is extended and used as a setting request message for setting an encoding condition of the source device 200 by the sink device 100.

Steps S31a to S33b of FIG. 16 are similar to those described using FIG. 15. The sink device 100 transmits an extended M3 request message (M3'-RTSP GET_PARAMETER Request) to the source device 200 to acquire encoding capability information of the source device 200 (Step S36a). The extended M3 request message corresponds to the above-described capability inquiry message. The source device 200 replies with an extended M3 response message (M3'-RTSP Response) including its own encoding capability information to the sink device 100 (Step S36b). Using the encoding capability information collected from the source device 200 in this manner, the sink device 100 can decide an encoding condition to be applied to the source device 200. The extended M3 response message may additionally include prioritized condition information of the source device 200.

When the encoding condition is decided, the sink device 100 transmits an extended M4 request message (M4'-RTSP SET_PARAMETER Request) to the source device 200 to instruct the source device 200 to set the encoding condition (Step S38a). The extended M4 request message corresponds to the above-described setting request message to designate an encoding condition to be used when the source device 200 encodes content. In response to the extended M4 request message, the source device 200 replies with an extended M4 response message (M4'-RTSP Response) (Step S38b).

(2) Modified Example

Figure 17:
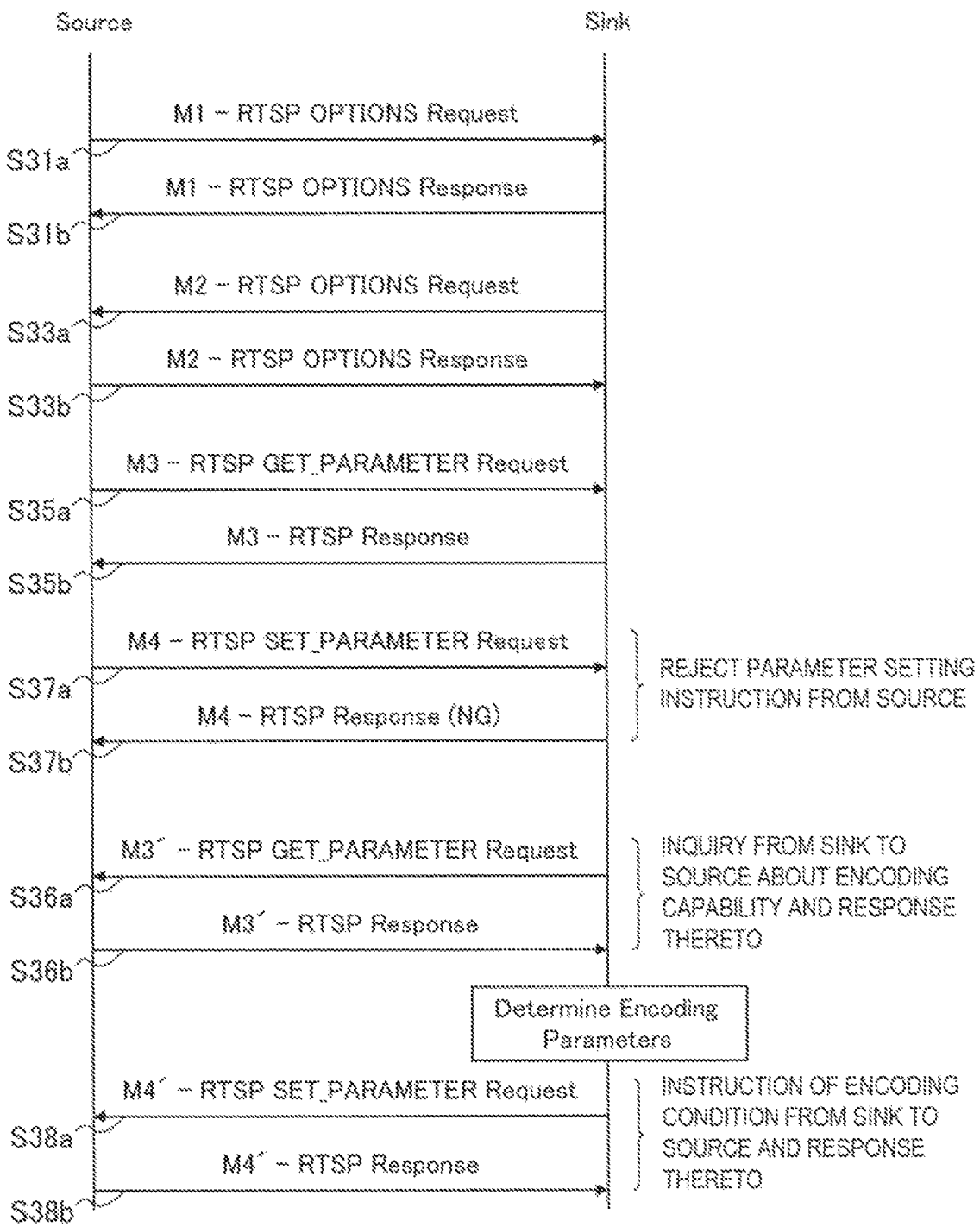
FIG. 17 is a sequence diagram showing another example of the flow of extended messaging between the sink device and the source device according to the first technique.

FIG. 17 is a sequence diagram showing another example of the flow of extended messaging between the sink device and the source device according to the first technique. In the example of FIG. 17, before a capability inquiry message, i.e., an extended M3 request message, is transmitted from the sink device 100 to the source device 200, a (non-extended) M4 request message is transmitted from the source device 200 to the sink device 100 according to the flow of the existing messaging described using FIG. 15 (Step S37a). In response to this M4 request message, the sink device 100 replies with an M4 response message (M4-RTSP Response (NG)) indicating rejection of setting of an instructed parameter (Step S37b). Thereafter, the extended M3 request/response messages and the extended M4 request/response messages are exchanged between the sink device 100 and the source device 200 as described using FIG. 16. Note that, when the parameter instructed in Step S37a meets the encoding condition to be set for the source device 200, the sink device 100 may accept the setting of the instructed parameter. In this case, in Step S37b, an M4 response message indicating that the setting of the instructed parameter is accepted can be sent in response.

Figure 18:
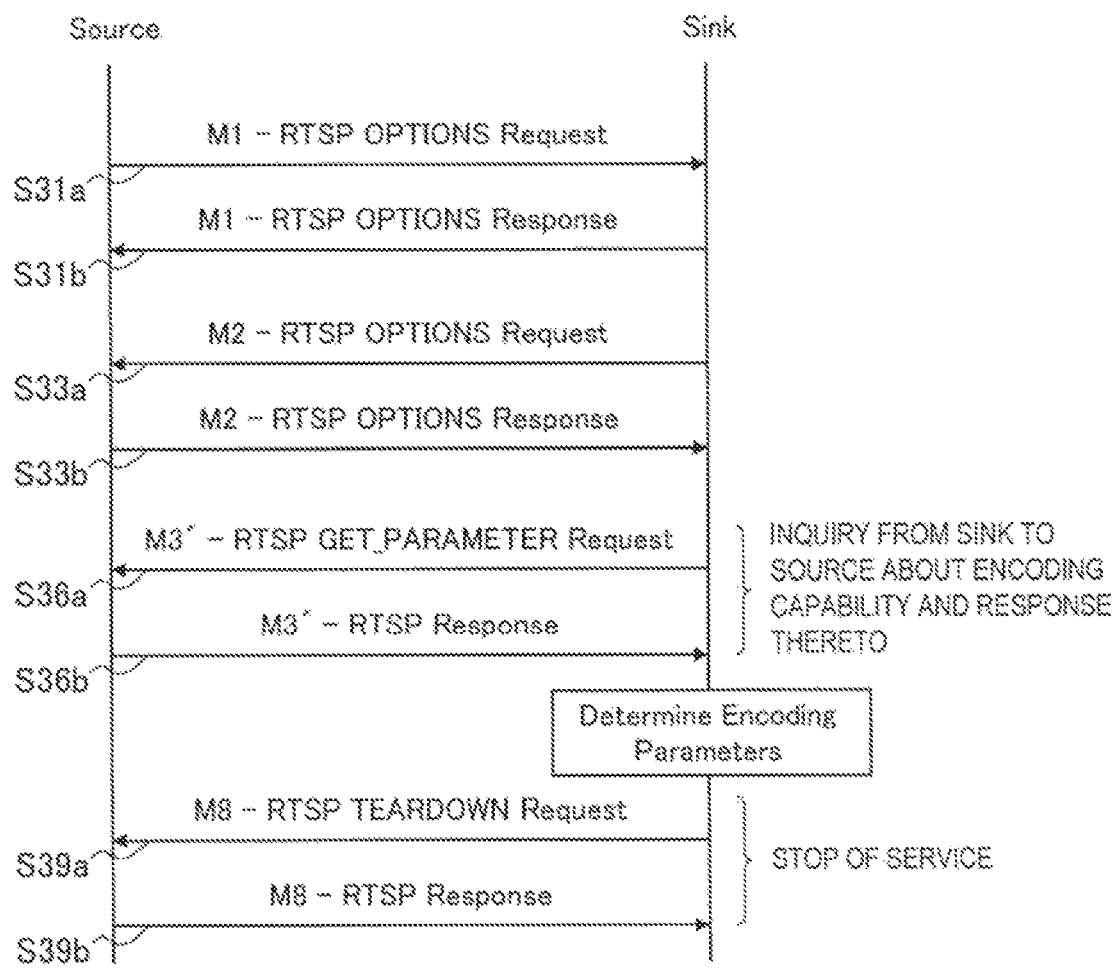
FIG. 18 is a sequence diagram showing an example of the flow of messaging when a service is to be discontinued.

FIG. 18 is a sequence diagram showing an example of the flow of messaging when a service is to be discontinued. Steps S31a to S36b of FIG. 18 are similar to those described using FIG. 16. The sink device 100 transmits the extended M3 request message to the source device 200 to acquire the encoding capability information of the source device 200 (Step S36a). The source device 200 replies with the extended M3 response message including its own encoding capability information to the sink device 100 (Step S36b). It is assumed that, as a result of a determination of the sink device 100 on an encoding condition to be applied to the source device 200 using the encoding capability information collected in that manner, the sink device 100 decides to stop the provision of a service from the source device 200. In this case, the sink device 100 transmits an M8 request message (M8-RTSP TEARDOWN Request) to the source device 200 to inform the source device 200 of a stop of the service (Step S39a). The source device 200 replies with an M8 response message (M8-RTSP Response) (Step S39b).

[6-4. Extended Messaging Sequence (A Second Technique)]

Figure 19:
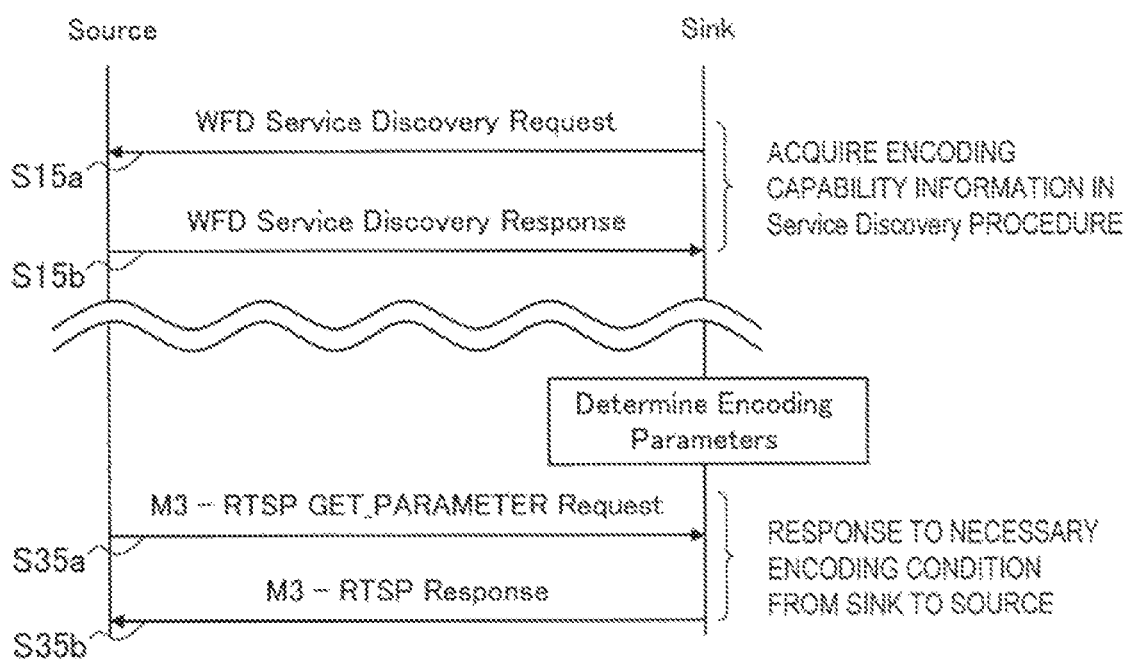
FIG. 19 is a sequence diagram showing an example of the flow of extended messaging between the sink device and the source device according to a second technique.

FIG. 19 is a sequence diagram showing an example of the flow of extended messaging between the sink device and the source device according to the second technique. In the second technique, a service discovery request message of Wi-Fi Direct is extended and used as a capability inquiry message from the sink device 100 to the source device 200 for inquiring about encoding capability information. The encoding condition information is included in the service discovery response message.

Referring to FIG. 19, the service discovery procedure shown in FIG. 14 is described, and the sink device 100 transmits an extended service discovery request message to the source device 200 (Step S15a). The extended service discovery request message corresponds to the above-described capability inquiry message. In response to the service discovery request message, the source device 200 replies with an extended service discovery response message to the sink device 100 (Step S15b). Using the encoding capability information collected from the source device 200 in this manner, the sink device 100 can decide an encoding condition to be applied to the source device 200. The extended service discovery response message may additionally include prioritized condition information of the source device 200.

Thereafter, the source device 200 transmits the (non-extended) M3 request message to the sink device 100 to acquire the parameter indicating the decoding capability of the sink device 100 (Step S35a). In response to the M3 request message, the sink device 100 replies with the M3 response message (Step S35b). At this time, the sink device 100 includes only a parameter corresponding to a necessary encoding condition decided for the source device 200 in the M3 response message. Accordingly, the encoding condition decided by the sink device 100 can be applied to the source device 200.

7. APPLICATION EXAMPLES

The technology according to the present disclosure can be applied to various products. For example, the sink device 100 and the source device 200 may be realized as mobile terminals such as smartphones, tablet PCs, notebook PCs, portable game terminals, or digital cameras, fixed-type terminals such as television receivers, printers, digital scanners, or network storages, or car-mounted terminals such as car navigation apparatuses. Furthermore, control modules mounted in such terminals (for example, integrated circuit modules configured in one die) may be provided.

7.1. First Application Example

Figure 20:
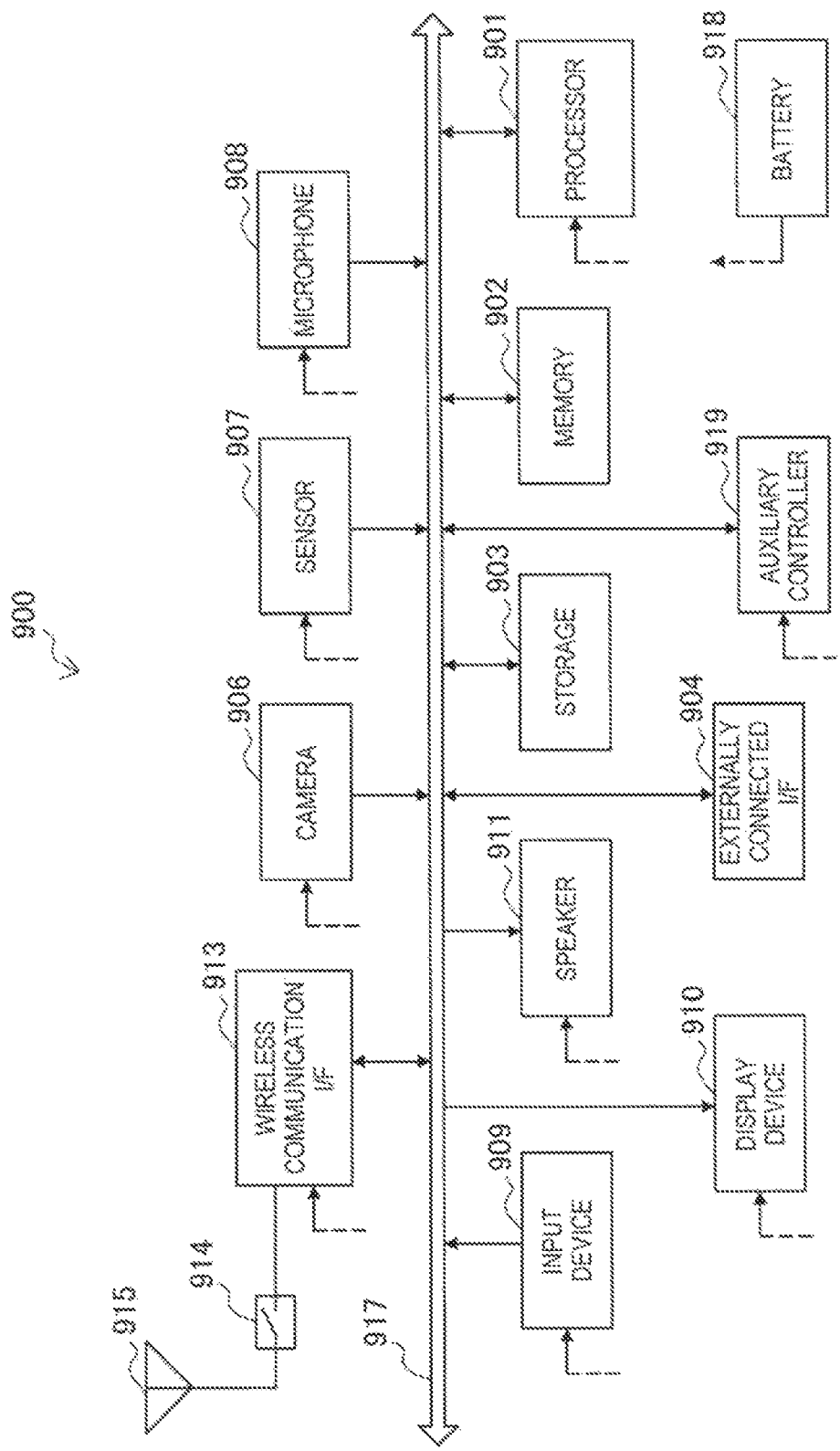
FIG. 20 is a block diagram showing an example of a schematic configuration of a smartphone.

FIG. 20 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in an ad hoc mode. Wi-Fi Direct is different from the ad hoc mode, and thus one of two terminals operates as an access point. However, communication is performed directly between the terminals. The wireless communication interface 913 can typically include a baseband processor, an RF (radio frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 20. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 20 via power supply lines partially indicated by dashed lines in the drawing. The auxiliary controller 919 causes, for example, required minimum functions of the smartphone 900 to be operated in a sleep mode.

In the smartphone 900 shown in FIG. 20, the reproduction control function of the sink device 100 or the encoding control function of the source device 200 can be implemented by the processor 901 or the auxiliary controller 919. For example, as the processor 901 controls reception of content from an external source device such that it does not exceed the actual decoding capability of the smartphone 900, it is possible for the smartphone 900 to smoothly execute reproduction of a plurality of pieces of content.

7.2. Second Application Example

Figure 21:
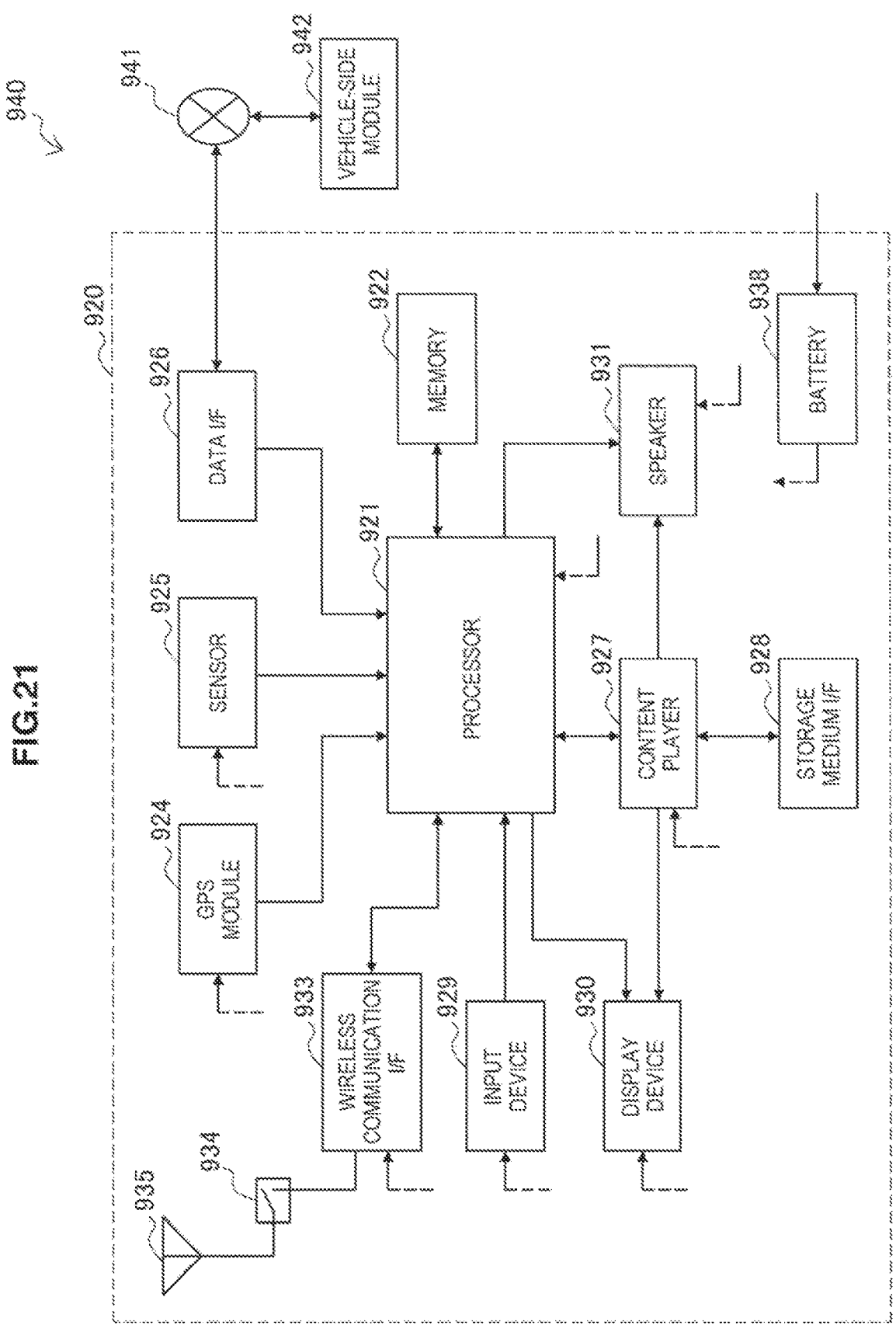
FIG. 21 is a block diagram showing an example of a schematic configuration of a car navigation device.

FIG. 21 is a block diagram showing an example of a schematic configuration of a car navigation apparatus 920 to which the technology of the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to in in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 21. In this case, the antenna switch 934 may be omitted from the configuration of the car navigation apparatus 920.

The battery 938 supplies electric power to each of the blocks of the car navigation apparatus 920 shown in FIG. 21 via power supply lines partially indicated by dashed lines in the drawing. In addition, the battery 938 accumulates electric power supplied from the vehicle.

In the car navigation apparatus 920 shown in FIG. 21, the reproduction control function of the sink device 100 or the encoding control function of the source device 200 can be implemented by the processor 921. For example, as the processor 921 controls reception of content from an external source device such that it does not exceed the actual decoding capability of the car navigation apparatus 920, it is possible for the car navigation apparatus 920 to smoothly execute reproduction of a plurality of pieces of content.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

8. CONCLUSION

So far, embodiments of the technology according to the present disclosure have been described in detail using FIGS. 1 to 21. According to the embodiments described above, in a situation in which a sink device (decoding apparatus) decodes and reproduces content received from a plurality of source devices (encoding apparatuses) via a wireless connection, the sink device controls an encoding condition of the plurality of source devices for the content such that a required decoding capability required for a set of the content to be reproduced does not exceed an actual decoding capability of the sink device. Thus, it is possible to appropriately coordinate the encoding condition of the plurality of source devices according to the capability of the sink device and to reproduce a plurality of pieces of content under an optimum condition.

In addition, according to the above-described embodiments, encoding capability information of each of the source devices is collected from the source devices to the sink device, and the sink device can decide an encoding condition of each sink device based on the collected encoding capability information. According to this configuration, it is possible for the sink device to play the role of a master mainly controlling content encoding and decoding conditions, unlike in existing technologies. For example, by merely giving user inputs relating to reproduction of content to the sink device, a user can enjoy a plurality of pieces of content in a desired form in a parallel manner while insufficiency of a decoding capability of the sink device is avoided.

In addition, according to the embodiments described above, the mechanism for collecting encoding capability information from each of the source devices to the sink device can be realized by merely slightly extending existing protocols. In the first technique, for example, the message for acquiring a parameter of the RTSP can be extended and used as a capability inquiry message from the sink device to a source device for inquiring about encoding capability information. In the second technique, the service discovery request message of Wi-Fi Direct can be extended and used as a capability inquiry message from the sink device to a source device for inquiring about encoding capability information. When such extensions are used, the technology according to the present disclosure can be realized at a lower cost, and compatibility with existing protocols is also ensured with ease.

The series of control processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution, such programs are written into a RAM (Random Access Memory) and executed by a processor such as a CPU.

Note that it is not necessary for the processes described in this specification with reference to the flowchart to be executed in the order shown in the flowchart. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A decoding apparatus including:
a wireless communication unit configured to establish a wireless connection with a plurality of encoding apparatuses;
a decoding unit configured to decode pieces of content received from the plurality of encoding apparatuses via the wireless communication unit;
a reproduction unit configured to reproduce the plurality of pieces of content decoded by the decoding unit; and
a control unit configured to control an encoding condition of each of the plurality of encoding apparatuses for content in a manner that a required decoding capability required by a set of the pieces of content to be reproduced by the reproduction unit does not exceed an actual decoding capability of the decoding unit.

(2) The decoding apparatus according to (1), wherein the control unit decides the encoding condition of each of the encoding apparatuses based on encoding capability information of the encoding apparatus received from each of the encoding apparatuses via the wireless communication unit.

(3) The decoding apparatus according to (2), wherein the control unit collects the encoding capability information from each of the encoding apparatuses by transmitting a capability inquiry message to each of the encoding apparatuses via the wireless communication unit.

(4) The decoding apparatus according to (3), wherein the capability inquiry message is a message for acquiring a parameter of Real Time Streaming Protocol (RTSP) that is extended for a sink device to inquire about the encoding capability information to a source device.

(5) The decoding apparatus according to (4), wherein the control unit controls the encoding condition of each of the encoding apparatuses by transmitting, to each of the encoding apparatuses, a message for setting a parameter of the RTSP extended by the sink device to set the encoding condition of the source device.

(6) The decoding apparatus according to (3), wherein the capability inquiry message is a service discovery request message of Wi-Fi Direct.

(7) The decoding apparatus according to any one of (1) to (6), wherein the required decoding capability and the actual decoding capability are expressed by at least one of a supported codec type, definition, a rate and a level of quality, the number of decoding circuits, and processor performance.

(8) The decoding apparatus according to any one of (1) to (7), wherein the encoding condition is a condition relating to at least one of a codec type used by each of the encoding apparatuses, definition, and a rate and a level of quality.

(9) The decoding apparatus according to any one of (1) to (8), wherein, when the required decoding capability exceeds the actual decoding capability, the control unit requires transmission of at least one piece of content without compression encoding from the encoding apparatus that has the at least one piece of content.

(10) The decoding apparatus according to any one of (1) to (9), wherein the control unit controls the encoding condition of each of the encoding apparatuses based further on connection quality of the wireless connection with each of the encoding apparatuses.

(11) The decoding apparatus according to any one of (1) to (10), wherein the control unit controls the encoding condition of each of the encoding apparatuses based further on a power supply state of each of the encoding apparatuses.

(12) The decoding apparatus according to any one of (1) to (11), wherein the control unit controls the encoding condition of each of the encoding apparatuses based further on prioritized condition information that specifies an encoding condition to be prioritized received from each of the encoding apparatuses.

(13) The decoding apparatus according to any one of (1) to (12), wherein the control unit further controls a frequency channel of the wireless connection with the plurality of encoding apparatuses according to the encoding condition of each of the plurality of encoding apparatuses.

(14) The decoding apparatus according to any one of (1) to (13), wherein, when a user input instructing updating of the set of the pieces of content to be reproduced is detected, the control unit compares the required decoding capability for the set after the updating to the actual decoding capability.

(15) The decoding apparatus according to any one of (1) to (14), wherein the control unit compares the actual decoding capability that is dynamically calculated based on a load imposed on the decoding unit to the required decoding capability.

(16) The decoding apparatus according to any one of (1) to (15), wherein the control unit causes a list of encoding apparatuses having content removed from the set in a manner that the required decoding capability does not exceed the actual decoding capability to be displayed on a screen displaying the plurality of pieces of content to be reproduced by the reproduction unit.

(17) The decoding apparatus according to (16), wherein the control unit maintains the wireless connection between the encoding apparatuses on the list and the wireless communication unit.

(18) A decoding method including:
decoding, by a decoding apparatus, pieces of content received from a plurality of encoding apparatuses via a wireless connection;
reproducing the plurality of pieces of decoded content; and
controlling, by the decoding apparatus, an encoding condition of each of the plurality of encoding apparatuses for content in a manner that a required decoding capability required by a set of the pieces of content to be reproduced does not exceed an actual decoding capability of the decoding apparatus.

(19) An encoding apparatus including:
a wireless communication unit configured to establish a wireless connection with a decoding apparatus that decodes and reproduces pieces of content received from a plurality of apparatuses;
an encoding unit configured to encode content to be transmitted to the decoding apparatus via the wireless communication unit; and
a control unit configured to control an encoding condition of the encoding unit for content based on a control message received from the decoding apparatus in a manner that a required decoding capability required by a set of the pieces of content to be reproduced by the decoding apparatus does not exceed an actual decoding capability of the decoding apparatus.

(20) An encoding method including:
encoding, by an encoding apparatus that transmits content via a wireless connection to a decoding apparatus that decodes and reproduces pieces of the content received from a plurality of apparatuses, the content to be transmitted to the decoding apparatus; and
controlling an encoding condition of the encoding apparatus for content based on a control message received from the decoding apparatus in a manner that a required decoding capability required by a set of the pieces of content to be reproduced by the decoding apparatus does not exceed an actual decoding capability of the decoding apparatus.

REFERENCE SIGNS LIST 1 content reproduction system
100 decoding apparatus (sink device)
110 wireless communication unit
120 stream acquisition unit
130 decoding unit
140 video reproduction unit
150 audio reproduction unit
160 reproduction control unit
170 storage unit
180 user interface unit
200 encoding apparatus (source device)
210 wireless communication unit
220 storage unit
230 content acquisition unit
240 encoding unit
250 stream transmission unit
260 encoding control unit
270 user interface unit

The invention claimed is:

1. A decoding sink apparatus, comprising:
circuitry configured to:
    establish a wireless connection with a plurality of encoding source apparatuses;
    receive, via the wireless connection, a first plurality of pieces of content from the plurality of encoding source apparatuses;
    determine a required decoding capability of the decoding sink apparatus to reproduce the first plurality of pieces of content,
        wherein the determination of the required decoding capability is based on a user operation corresponding to the first plurality of pieces of content;
    compare the determined required decoding capability with an actual decoding capability of the decoding sink apparatus;
    determine, based on the comparison, whether the required decoding capability of the decoding sink apparatus exceeds the actual decoding capability of the decoding sink apparatus;
    update the first plurality of pieces of content based on the determination that the required decoding capability of the decoding sink apparatus exceeds the actual decoding capability of the decoding sink apparatus;
    control an encoding condition of each encoding source apparatus of the plurality of encoding source apparatuses based on the updated first plurality of pieces of content;
    receive a second plurality of pieces of content based on the controlled encoding condition of each encoding source apparatus of the plurality of encoding source apparatuses;
    decode the received second plurality of pieces of content; and
    reproduce the decoded second plurality of pieces of content.

2. The decoding sink apparatus according to claim 1, wherein the circuitry is further configured to:
    acquire, via the wireless connection, encoding capability information from each encoding source apparatus of the plurality of encoding source apparatuses; and
    determine the encoding condition of each encoding source apparatus of the plurality of encoding source apparatuses based on the acquired encoding capability information.

3. The decoding sink apparatus according to claim 2, wherein the circuitry is further configured to:
    transmit, via the wireless connection, a capability inquiry message to each encoding source apparatus of the plurality of encoding source apparatuses; and
    acquire the encoding capability information from each encoding source apparatus of the plurality of encoding source apparatuses based on the transmission of the capability inquiry message.

4. The decoding sink apparatus according to claim 3, wherein the capability inquiry message corresponds to acquisition of a first parameter of Real Time Streaming Protocol (RTSP) to inquire about the encoding capability information.

5. The decoding sink apparatus according to claim 4, wherein
    the circuitry is further configured to control the encoding condition of each encoding source apparatus of the plurality of encoding source apparatuses based on the transmission of the capability inquiry message to each encoding source apparatus of the plurality of encoding source apparatuses,
    a second parameter is set based on the transmission of the capability inquiry message, and
    the second parameter corresponds to the RTSP to set the encoding condition of the plurality of encoding source apparatuses.

6. The decoding sink apparatus according to claim 3, wherein the capability inquiry message is a service discovery request message of Wi-Fi Direct.

7. The decoding sink apparatus according to claim 1, wherein the required decoding capability and the actual decoding capability are expressed by at least one of a supported codec type of the first plurality of pieces of content, a definition of the first plurality of pieces of content, a bit rate of the first plurality of pieces of content, or a level of quality of the first plurality of pieces of content.

8. The decoding sink apparatus according to claim 1, wherein the encoding condition corresponds to at least one of a codec type supported by each encoding source apparatus of the plurality of encoding source apparatuses, a definition, a bit rate, or a level of quality of the first plurality of pieces of content.

9. The decoding sink apparatus according to claim 1, wherein the circuitry is further configured to:
    transmit a request to an encoding source apparatus of the plurality of encoding source apparatuses based on the determined required decoding capability that exceeds the actual decoding capability; and
    receive at least one piece of content of the second plurality of pieces of content without compression encoding, based on the transmitted request, wherein
        the encoding source apparatus has the at least one piece of content of the second plurality of pieces of content.

10. The decoding sink apparatus according to claim 1, wherein the circuitry is further configured to control the encoding condition of each encoding source apparatus of the plurality of encoding source apparatuses based on a corresponding power supply state of each encoding source apparatus of the plurality of encoding source apparatuses.

11. The decoding sink apparatus according to claim 1, wherein the circuitry is further configured to:

receive prioritized condition information from each encoding source apparatus of the plurality of encoding source apparatuses; and control the encoding condition of each encoding source apparatus of the plurality of encoding source apparatuses based on the received prioritized condition information, wherein the received prioritized condition information specifies the encoding condition to be prioritized.

12. The decoding sink apparatus according to claim 1, wherein the circuitry is further configured to control, based on the encoding condition of each encoding source apparatus of the plurality of encoding source apparatuses, a corresponding frequency channel of the wireless connection with each encoding source apparatus of the plurality of encoding source apparatuses.

13. The decoding sink apparatus according to claim 1, wherein the actual decoding capability is dynamically calculated based on a load imposed on the circuitry.

14. The decoding sink apparatus according to claim 1, wherein the circuitry is further configured to control a display screen to display a list of the plurality of encoding source apparatuses based on removal of at least one piece of content from the first plurality of pieces of content such that the required decoding capability is less than the actual decoding capability.

15. The decoding sink apparatus according to claim 14, wherein the circuitry is further configured to maintain the wireless connection with at least one encoding source apparatus of the plurality of encoding source apparatuses.

16. The decoding sink apparatus according to claim 1, wherein the circuitry is further configured to control the encoding condition of each encoding source apparatus of the plurality of encoding source apparatuses based on a connection quality of the wireless connection between the decoding sink apparatus and the plurality of encoding source apparatuses.

17. A decoding method, comprising:
in a decoding sink apparatus that comprises circuitry:
establishing, by the circuitry, a wireless connection with a plurality of encoding source apparatuses;
receiving, by the circuitry, via the wireless connection, a first plurality of pieces of content from the plurality of encoding source apparatuses;
determining, by the circuitry, a required decoding capability of the decoding sink apparatus to reproduce the first plurality of pieces of content,
wherein the determination of the required decoding capability is based on a user operation corresponding to the first plurality of pieces of content;
comparing, by the circuitry, the determined required decoding capability with an actual decoding capability of the decoding sink apparatus;
determining, by the circuitry, based on the comparison, whether the required decoding capability of the decoding sink apparatus exceeds the actual decoding capability of the decoding sink apparatus;
updating, by the circuitry, the first plurality of pieces of content based on the determination that the required decoding capability of the decoding sink apparatus exceeds the actual decoding capability of the decoding sink apparatus;
controlling, by the circuitry, an encoding condition of each encoding source apparatus of the plurality of encoding source apparatuses based on the updated first plurality of pieces of content;

receiving, by the circuitry, a second plurality of pieces of content based on and the controlled encoding condition of each encoding source apparatus of the plurality of encoding source apparatuses;
decoding, by the circuitry, the received second plurality of pieces of content; and
reproducing, by the circuitry, the decoded second plurality of pieces of content.

18. An encoding source apparatus, comprising:
circuitry configured to:
establish a wireless connection with a decoding sink apparatus;
encode a first plurality of pieces of content;
receive a control message from the decoding sink apparatus;
control, based on the received control message, an encoding condition of the encoding source apparatus to enable concurrent reproduction of the first plurality of pieces of content by the decoding sink apparatus, wherein
the control message is generated by the decoding sink apparatus based on:
a determination of a required decoding capability of the decoding sink apparatus to reproduce the first plurality of pieces of content,
a comparison of the determined required decoding capability with an actual decoding capability of the decoding sink apparatus, and
a determination, based on the comparison, whether the required decoding capability of the decoding sink apparatus exceeds the actual decoding capability of the decoding sink apparatus;
generate a second plurality of pieces of content based on an update of the first plurality of pieces of content, wherein the update of the first plurality of pieces of content is based on the required decoding capability of the decoding sink apparatus that exceeds the actual decoding capability of the decoding sink apparatus; and
transmit the generated second plurality of pieces of content to the decoding sink apparatus.

19. An encoding method, comprising:
in an encoding source apparatus that comprises circuitry:
establishing, by the circuitry, a wireless connection with a decoding sink apparatus;
encoding, by the circuitry, a first plurality of pieces of content;
receiving, by the circuitry, a control message from the decoding sink apparatus;
controlling, by the circuitry, an encoding condition of the encoding source apparatus to enable concurrent reproduction of the first plurality of pieces of content by the decoding sink apparatus, wherein
the control of the encoding condition of the encoding source apparatus is based on the control message, and
the control message is generated by the decoding sink apparatus based on:
a determination of a required decoding capability of the decoding sink apparatus to reproduce the first plurality of pieces of content,
a comparison of the determined required decoding capability with an actual decoding capability of the decoding sink apparatus; and
a determination, based on the comparison, whether the required decoding capability of the decoding sink apparatus exceeds the actual decoding capability of the decoding sink apparatus;

generating, by the circuitry, a second plurality of pieces of content based on an update of the first plurality of pieces of content, wherein the update of the first plurality of pieces of content is based on the required decoding capability of the decoding sink apparatus that exceeds the actual decoding capability of the decoding sink apparatus; and transmitting, by the circuitry, the generated second plurality of pieces of content to the decoding sink apparatus.

* * * * *